(12) United States Patent
Takaoka et al.

(10) Patent No.: US 11,964,246 B2
(45) Date of Patent: Apr. 23, 2024

(54) STATE MONITORING SYSTEM

(71) Applicant: Shashin Kagaku Co., Ltd., Kyoto (JP)

(72) Inventors: Fumihiko Takaoka, Kyoto (JP); Ryosuke Eto, Kyoto (JP)

(73) Assignee: Shashin Kagaku Co., Ltd., Kyoto (JP)

(*) Notice: Subject to any disclaimer, the term of this patent is extended or adjusted under 35 U.S.C. 154(b) by 849 days.

(21) Appl. No.: 16/982,710

(22) PCT Filed: Mar. 22, 2019

(86) PCT No.: PCT/JP2019/012054
§ 371 (c)(1),
(2) Date: Sep. 21, 2020

(87) PCT Pub. No.: WO2019/182105
PCT Pub. Date: Sep. 26, 2019

(65) Prior Publication Data
US 2021/0001292 A1 Jan. 7, 2021

(30) Foreign Application Priority Data
Mar. 22, 2018 (JP) .................................. 2018-055360

(51) Int. Cl.
*B01F 35/213* (2022.01)
*B01F 35/00* (2022.01)
(Continued)

(52) U.S. Cl.
CPC .......... *B01F 35/213* (2022.01); *B01F 35/189* (2022.01); *B01F 35/2144* (2022.01); *G01J 5/00* (2013.01)

(58) Field of Classification Search
None
See application file for complete search history.

(56) References Cited

U.S. PATENT DOCUMENTS

| 2005/0150830 A1* | 7/2005 | Laugharn, Jr. | .......... B01F 33/30 366/127 |
| 2005/0157327 A1* | 7/2005 | Shoji | ................... G06F 11/0751 358/1.14 |

(Continued)

FOREIGN PATENT DOCUMENTS

| CN | 1872378 A | 12/2006 |
| JP | 458841 A | 2/1992 |

(Continued)

*Primary Examiner* — Erica S Lin
(74) *Attorney, Agent, or Firm* — The Webb Law Firm

(57) ABSTRACT

A state monitoring system for stirring-degassing processing that includes: a sensor unit and a computer, the sensor unit including a temperature sensor that determines a temperature of a processing target material and a first transmitter-receiver that transmits output values of the temperature sensor to the computer, the computer includes a second transmitter-receiver, an information recorder, and a processor, the second transmitter-receiver receives output values of the temperature sensor transmitted by the first transmitter-receiver. A phenomenon that may appear in output values of the temperature sensor during processing and content of post-comparison determination processing performed by the processor according to the phenomenon are associated in information that is recorded in the information recorder, and the processor compares information recorded in the information recorder and a specific phenomenon that has appeared in output values of the temperature sensor during processing, and performs post-comparison determination processing according to a result of the comparison.

10 Claims, 14 Drawing Sheets

(51) Int. Cl.
*B01F 35/214* (2022.01)
*G01J 5/00* (2022.01)

(56) References Cited

U.S. PATENT DOCUMENTS

| | | | | |
|---|---|---|---|---|
| 2007/0244271 | A1* | 10/2007 | Muhle | C08F 10/00 |
| | | | | 526/74 |
| 2008/0250869 | A1* | 10/2008 | Breed | G06V 40/10 |
| | | | | 73/861.27 |
| 2010/0150203 | A1* | 6/2010 | Timmann | B01L 7/52 |
| | | | | 374/45 |
| 2012/0076428 | A1* | 3/2012 | Yokono | G06V 40/113 |
| | | | | 382/219 |
| 2013/0030723 | A1* | 1/2013 | Gao | B29C 45/77 |
| | | | | 702/50 |
| 2015/0059469 | A1* | 3/2015 | Batti | G01K 1/14 |
| | | | | 374/208 |
| 2016/0198129 | A1* | 7/2016 | Proud | A61B 5/1118 |
| | | | | 348/143 |
| 2017/0003679 | A1* | 1/2017 | Miura | F25B 25/005 |
| 2018/0325466 | A1* | 11/2018 | An | A61B 5/346 |
| 2018/0358562 | A1* | 12/2018 | Takita | H05B 47/11 |
| 2020/0232850 | A1 | 7/2020 | Takaoka et al. | |

FOREIGN PATENT DOCUMENTS

| | | |
|---|---|---|
| JP | H7248327 A | 9/1995 |
| JP | 3058116 U | 3/1999 |
| JP | H11290668 A | 10/1999 |
| JP | 2002116086 A | 4/2002 |
| JP | 2002286551 A | 10/2002 |
| JP | 200818431 A | 1/2008 |
| JP | 2013244475 A | 12/2013 |
| JP | 2015136689 A | 7/2015 |
| JP | 2016159186 A | 9/2016 |
| JP | 2016159187 A | 9/2016 |
| JP | 2017205705 A | 11/2017 |
| JP | 6388992 B1 | 8/2018 |

* cited by examiner (a)

(b)

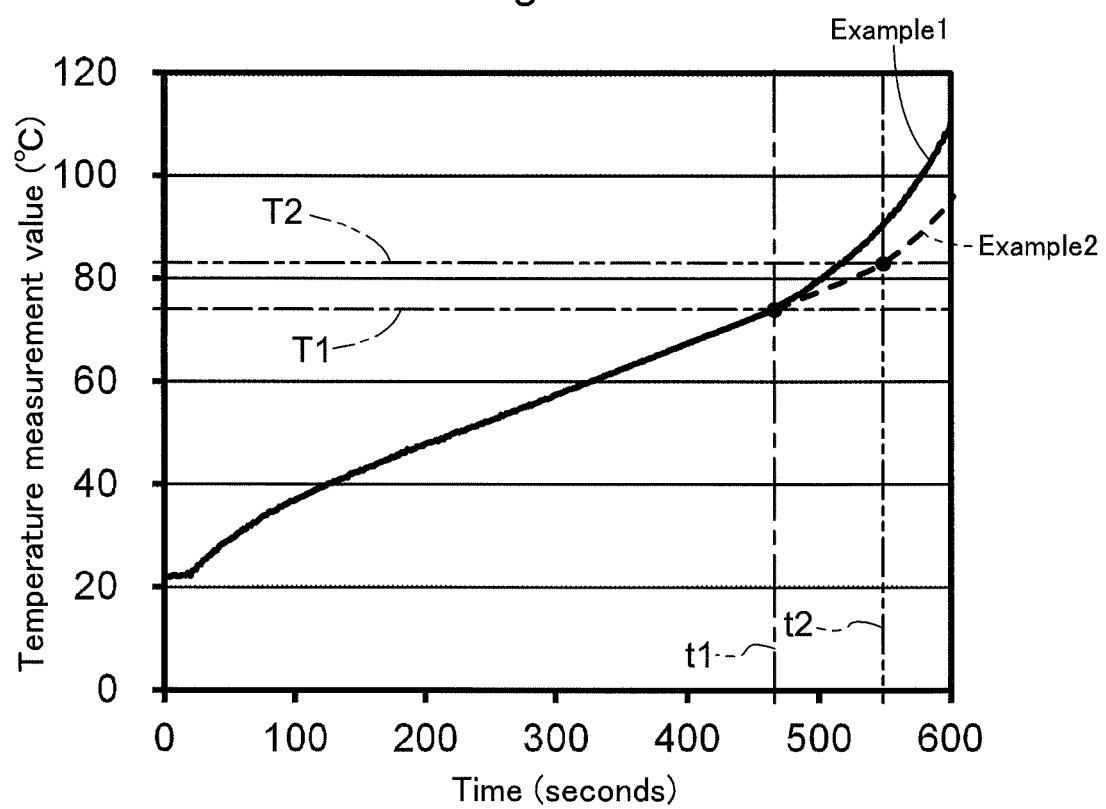

STATE MONITORING SYSTEM

CROSS-REFERENCE TO RELATED APPLICATIONS

This application is the United States national phase of International Application No. PCT/JP2019/012054 filed Mar. 22, 2019, and claims priority to Japanese Patent Application No. 2018-055360 filed Mar. 22, 2018, the disclosures of which are hereby incorporated by reference in their entirety.

TECHNICAL FIELD

The present invention relates to a state monitoring system for stirring-degassing processing that is performed while revolving and rotating a container containing a processing target material in a stirring-degassing apparatus.

BACKGROUND ART

In order to observe the state of a processing target material in real time during stirring-degassing processing, an observation method in which stroboscopic photography is performed using a light source and a camera in synchronization with turning movement has been conventionally used as disclosed in Patent Document 1. If the state of a processing target material is checked in synchronization with turning movement as described above, optimization of stirring-degassing processing conditions can be assisted.

This observation method is advantageous in that a phenomenon actually occurring in the processing can be checked using image data and if there is a problem, causes of the problem can be presumed, which particularly contributes to the development of products.

PRIOR ART DOCUMENTS

Patent Documents

Patent Document 1: JP H11-290668A

DISCLOSURE OF THE INVENTION

Problem to be Solved by the Invention

However, in order to perform an observation method using a photographic camera, an installation for enabling photography needs to be provided on a stirring-degassing apparatus and an existing stirring-degassing apparatus needs to be significantly altered.

Also, it is difficult to quantify image data, and experience and knowledge of a skilled technical expert are required to understand situations from image data.

Furthermore, captured image data needs to be monitored by a person to control the quality of products, but it is difficult to momentarily determine the state of a processing target material and take an action. Furthermore, a high level of skill in image processing is required to quantify image data, and it is difficult to automatically monitor the state of a processing target material by using image data for the purpose of quality control. As a result, it has been difficult to perform processing according to the state of the processing target material in real time.

The present invention was made in view of the above-described problems, and an object of the present invention is to provide a state monitoring system with which the state of a processing target material can be easily and quantitatively monitored in real time during stirring-degassing processing. Note that in the specification of the present application, the term "stirring-degassing" means stirring a processing target material, degassing for removing bubbles contained in a processing target material, or both the stirring and the degassing.

Means for Solving Problem

In a characteristic configuration of a state monitoring system according to the present invention for achieving the above-described object, the state monitoring system is a state monitoring system for stirring-degassing processing that is performed while revolving and rotating a container containing a processing target material in a stirring-degassing apparatus, and includes
  a sensor unit and an analysis unit,
  wherein the sensor unit includes a temperature sensor that can determine a temperature of the processing target material and a first transmitter-receiver that transmits output values of the temperature sensor to the analysis unit,
  the analysis unit includes a second transmitter-receiver, a recording unit, and a determination unit,
  the second transmitter-receiver receives output values of the temperature sensor transmitted by the first transmitter-receiver,
  a phenomenon that may appear in output values of the temperature sensor during the stirring-degassing processing and content of post-comparison determination processing performed by the determination unit according to the phenomenon are associated with each other in information that is recorded in the recording unit, and
  the determination unit compares information recorded in the recording unit and a specific phenomenon that has appeared in output values of the temperature sensor during the stirring-degassing processing, and performs the post-comparison determination processing according to a result of comparison.

According to this characteristic configuration, the determination unit compares a specific phenomenon that has appeared in output values of the temperature sensor during stirring-degassing processing and information recorded in the recording unit, i.e., information in which a phenomenon that may appear in output values of the temperature sensor during stirring-degassing processing is associated with content of post-comparison determination processing performed by the determination unit according to the phenomenon. That is, the determination unit can easily and quantitatively monitor the state of the processing target material in real time during stirring-degassing processing by referring to output values of the temperature sensor during stirring-degassing processing.

In addition, the determination unit performs post-comparison determination processing according to the result of the comparison. That is, the determination unit can perform processing according to the state of the processing target material in real time.

Accordingly, it is possible to provide a state monitoring system with which the state of the processing target material can be easily and quantitatively monitored in real time during stirring-degassing processing and processing can be performed according to the state of the processing target material.

In another characteristic configuration of the state monitoring system according to the present invention, stirring-degassing processing information that includes at least one of processing target material information and processing condition information regarding the stirring-degassing processing, a phenomenon that may appear in output values of the temperature sensor during the stirring-degassing processing, and content of the post-comparison determination processing performed by the determination unit according to the phenomenon are associated with each other in information that is recorded in the recording unit, and the determination unit performs extraction processing for extracting, from information recorded in the recording unit, information that corresponds to the stirring-degassing processing information regarding the stirring-degassing processing set prior to execution of the stirring-degassing processing, compares the information extracted from the recording unit in the extraction processing and a specific phenomenon that has appeared in output values of the temperature sensor during the stirring-degassing processing, and performs the post-comparison determination processing according to a result of comparison.

According to this characteristic configuration, even if various kinds of stirring-degassing processing information are recorded in the recording unit, the determination unit can perform extraction processing to extract, from information recorded in the recording unit, information corresponding to stirring-degassing processing information regarding stirring-degassing processing set prior to execution of the stirring-degassing processing. As a result, the determination unit can appropriately compare a specific phenomenon that is recorded in the recording unit and may appear in output values of the temperature sensor during the stirring-degassing processing and information in which a phenomenon that may appear in output values of the temperature sensor during stirring-degassing processing is associated with content of post-comparison determination processing performed by the determination unit according to the phenomenon.

In another characteristic configuration of the state monitoring system according to the present invention, the state monitoring system is a state monitoring system for stirring-degassing processing that is performed while revolving and rotating a container containing a processing target material in a stirring-degassing apparatus, and includes:

a sensor unit and an analysis unit, wherein the sensor unit includes a temperature sensor that can determine a temperature of the processing target material and a first transmitter-receiver that transmits output values of the temperature sensor to the analysis unit, the analysis unit includes a second transmitter-receiver, a recording unit, and a determination unit, the second transmitter-receiver receives output values of the temperature sensor transmitted by the first transmitter-receiver, and the analysis unit performs output value recording processing for recording output values of the temperature sensor that are obtained in the stirring-degassing processing and received by the second transmitter-receiver, and information recording processing for recording a specific phenomenon appearing in the output values of the temperature sensor recorded in the output value recording processing and content of post-comparison determination processing that is performed by the determination unit according to the phenomenon, in association with each other in the recording unit.

According to this characteristic configuration, the analysis unit performs information recording processing for recording a specific phenomenon appearing in the output values of the temperature sensor recorded in the output value recording processing and content of post-comparison determination processing that is performed by the determination unit according to the phenomenon, in association with each other in the recording unit. That is, post-comparison determination processing performed according to the state of the processing target material during stirring-degassing processing can be determined by referring to information recorded in the recording unit.

In another characteristic configuration of the state monitoring system according to the present invention, in the information recording processing, the analysis unit records a specific phenomenon appearing in the output values of the temperature sensor recorded in the output value recording processing, content of the post-comparison determination processing performed by the determination unit according to the phenomenon, and stirring-degassing processing information including at least one of processing target material information and processing condition information regarding the stirring-degassing processing, in association with each other in the recording unit.

According to this characteristic configuration, the analysis unit performs information recording processing for recording, in the recording unit, a specific phenomenon appearing in the output values of the temperature sensor recorded in the output value recording processing and content of the post-comparison determination processing performed by the determination unit according to the phenomenon, in association with stirring-degassing processing information including at least one of processing target material information and processing condition information regarding the stirring-degassing processing. As a result, even if various kinds of stirring-degassing processing information are recorded in the recording unit, information corresponding to specific stirring-degassing processing information regarding the stirring-degassing processing can be extracted from information recorded in the recording unit.

In another characteristic configuration of the state monitoring system according to the present invention, the analysis unit includes an output unit that outputs information, and the output unit outputs information that indicates content of the post-comparison determination processing performed by the determination unit.

According to this characteristic configuration, if an operator obtains the information output by the output unit, for example, the operator can know content of the post-comparison determination processing to be performed.

In another characteristic configuration of the state monitoring system according to the present invention, the post-comparison determination processing is processing for determining the state or state transition of the processing target material according to the specific phenomenon that has appeared in output values of the temperature sensor during the stirring-degassing processing.

According to this characteristic configuration, in the post-comparison determination processing, the determination unit can determine the state or state transition of the processing target material according to the specific phenomenon that has appeared in output values of the temperature sensor during the stirring-degassing processing.

In another characteristic configuration of the state monitoring system according to the present invention, the post-comparison determination processing is processing for taking an action according to the specific phenomenon that has appeared in output values of the temperature sensor during the stirring-degassing processing. Here, the action may also be set according to the state or state transition of the processing target material corresponding to the specific phenomenon that has appeared in output values of the temperature sensor during the stirring-degassing processing.

In addition, the action may also be outputting an alarm from the output unit. Alternatively, the action may also be recording that the stirring-degassing processing has been normally executed, recording that the stirring-degassing processing has not been normally executed, or recording that a phenomenon that is recorded in the recording unit and may appear in output values of the temperature sensor during the stirring-degassing processing could not be detected in output values of the temperature sensor obtained in the stirring-degassing processing. Alternatively, the action may also be determining an operation instruction for the stirring-degassing apparatus.

According to this characteristic configuration, in the post-comparison determination processing, the determination unit can take an action according to the specific phenomenon that has appeared in output values of the temperature sensor during the stirring-degassing processing.

In another characteristic configuration of the state monitoring system according to the present invention, phenomena that appear in output values of the temperature sensor during the stirring-degassing processing include a temporal change in the output values that can be identified using at least one of an increase rate of the output values, a reduction rate of the output values, a change in the increase rate, and a change in the reduction rate.

According to this characteristic configuration, the state of the processing target material can be easily and quantitatively monitored in real time during stirring-degassing processing by referring to a temporal change that appears in output values of the temperature sensor during stirring-degassing processing and can be identified using at least one of an increase rate of the output values, a reduction rate of the output values, a change in the increase rate, and a change in the reduction rate.

In another characteristic configuration of the state monitoring system according to the present invention, the state monitoring system is a state monitoring system for stirring-degassing processing that is performed while revolving and rotating a container containing a processing target material in a stirring-degassing apparatus, and includes
  a sensor unit and an analysis unit,
  wherein the sensor unit includes a temperature sensor that can determine a temperature of the processing target material and a first transmitter-receiver that transmits output values of the temperature sensor to the analysis unit,
  the analysis unit includes a second transmitter-receiver, a recording unit, and a determination unit,
  the second transmitter-receiver receives output values of the temperature sensor transmitted by the first transmitter-receiver,
  a temporal change in output values of the temperature sensor that may appear during the stirring-degassing processing is recorded in the recording unit, and
  the determination unit determines similarity between the temporal change in output values of the temperature sensor that is recorded in the recording unit and may appear during the stirring-degassing processing and a temporal change in output values of the temperature sensor that has appeared during the stirring-degassing processing.

According to this characteristic configuration, the determination unit compares the similarity between the temporal change in output values of the temperature sensor that is recorded in the recording unit and may appear during the stirring-degassing processing and a temporal change in output values of the temperature sensor that has appeared during the stirring-degassing processing. That is, the determination unit can easily and quantitatively monitor the state of the processing target material in real time during stirring-degassing processing based on the similarity between the temporal changes.

In another characteristic configuration of the state monitoring system according to the present invention, the state monitoring system is a state monitoring system for stirring-degassing processing that is performed while revolving and rotating a container containing a processing target material in a stirring-degassing apparatus, and includes
  a sensor unit and an analysis unit,
  wherein the sensor unit includes a temperature sensor that measures intensity of radiation light radiated from the processing target material and a first transmitter-receiver that transmits output values of the temperature sensor to the analysis unit,
  the analysis unit includes a second transmitter-receiver and a determination unit,
  the second transmitter-receiver receives output values of the temperature sensor transmitted by the first transmitter-receiver, and
  if a magnitude of a change rate of output values of the temperature sensor has become equal to or larger than a set value during the stirring-degassing processing of the processing target material, the determination unit determines that vaporization of a substance contained in the processing target material has occurred.

According to this characteristic configuration, the determination unit can quantitatively determine whether or not vaporization of a substance contained in the processing target material has occurred, in real time.

BRIEF DESCRIPTION OF THE DRAWINGS

FIG. 16 is a graph showing temporal transition of temperature measurement values.

BEST MODE FOR CARRYING OUT THE INVENTION

The following describes an embodiment of the present invention with reference to the drawings. However, the following embodiment does not provide limited interpretation in recognition of the gist of the present invention. The same or like members are denoted with the same reference signs, and descriptions thereof may be omitted.

Apparatus Configuration

The following describes a configuration of state monitoring system 1 that monitors a stirring-degassing state in real time. Note that in the specification of the present application, the term "stirring-degassing" means stirring a processing target material, degassing for removing bubbles contained in a processing target material, or both the stirring and the degassing. That is, a stirring-degassing apparatus can be used to perform stirring processing for stirring a processing target material, degassing processing for removing bubbles contained in a processing target material, or both the stirring processing and the degassing processing.

Figure 1:
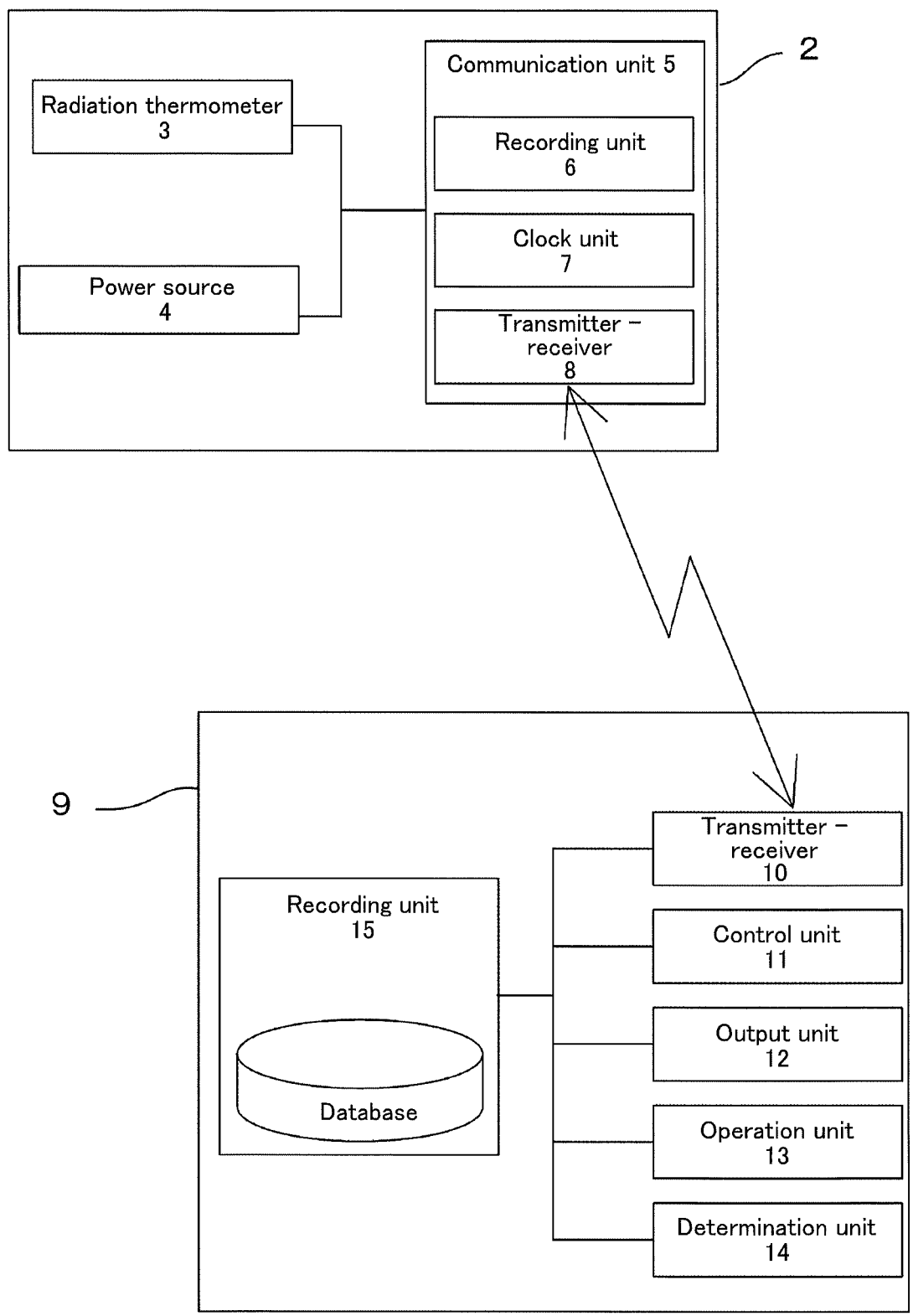
FIG. 1 is a diagram showing a main configuration of a state monitoring system.

FIG. 1 shows the configuration of state monitoring system 1 for stirring-degassing processing.

Sensor unit 2 includes temperature sensor 3 (e.g., an infrared temperature sensor) that can determine the temperature of a processing target material, power source 4 (e.g., a battery), and communication unit 5. Temperature sensor 3 can be realized using various sensors that can determine the temperature of a processing target material. For example, temperature sensor 3 can be realized using a non-contact type temperature sensor, such as a radiation thermometer that measures the intensity of radiation light (infrared light) radiated from a processing target material and determines the temperature of the processing target material based on the measured value, or a contact type temperature sensor that determines the temperature of a processing target material by using a thermocouple or the like. Note that temperature sensor 3 is shown as radiation thermometer 3 in FIG. 1. Communication unit 5 includes recording unit 6, clock unit 7, and transmitter-receiver 8 (one example of a "first transmitter-receiver" in the present invention) that transmits output values of temperature sensor 3 to analysis unit 9.

The following describes a case in which temperature sensor 3 is radiation thermometer 3 that is installed on the upper side, for example, a lid of container 20 containing a processing target material and directly measures the temperature of the processing target material based on the intensity of radiation light radiated from the processing target material. In this sense, "temperature sensor 3" in the present invention means a sensor that measures a physical quantity relating to radiation light, such as infrared light, radiated from a substance.

Following a measurement instruction that is recorded in recording unit 6, communication unit 5 reads temperature measurement values of temperature sensor 3, i.e., output values of temperature sensor 3 at a predetermined frequency, for example, at intervals of 1 second, for a predetermined period, for example, from the start to the end of stirring-degassing processing, at time points specified using a measurement function of clock unit 7, and outputs (transmits) the temperature measurement values and measurement time points from transmitter-receiver 8 in accordance with wireless communication standards, for example, IEEE 802.15.4.

Power source 4 supplies power to temperature sensor 3 and communication unit 5.

Analysis unit 9 includes transmitter-receiver 10 (one example of a "second transmitter-receiver" in the present invention), control unit 11, output unit 12, operation unit 13, determination unit 14 (one example of a "determination unit" in the present invention), and recording unit 15. Analysis unit 9 can be realized using a computer or the like, for example. Determination unit 14 can be realized using a processor included in the computer and can perform various kinds of processing described below.

Analysis unit 9 can receive, through transmitter-receiver 10, output values of temperature sensor 3 transmitted from transmitter-receiver 8 of sensor unit 2, i.e., temperature measurement values and measurement time points transmitted from sensor unit 2. Therefore, transmission and reception can be performed between sensor unit 2 and analysis unit 9 during stirring-degassing processing, and a state can be monitored in real time based on temperature measurement values.

Operation unit 13 serves as an interface between analysis unit 9 and an operator and inputs instructions and information from the operator. For example, materials constituting the processing target material (processing target material information, which will be described later, and the like) and processing conditions (processing condition information, which will be described later, and the like) can be input, and input information can be recorded (registered) in recording unit 15 by control unit 11.

Output unit 12 can be realized using a display unit that can output information by using textual information, turning a light on or off, or through blinking of a light, a speaker that can output audio information, and the like.

Control unit 11 records temperature measurement values acquired from transmitter-receiver 10 together with measurement time points, in recording unit 15. Temperature measurement values and measurement time points can also be displayed in output unit 12.

Determination unit 14 reads temperature measurement values and measurement time points recorded in recording unit 15, determines the state of the processing target material based on determination conditions (action, which will be described later) that are recorded (registered) in recording unit 15, and takes an action according to the determined state based on content of the action recorded in recording unit 15, such as displaying an alarm, outputting an instruction to stop stirring-degassing processing, or storing history that indicates normal completion.

Characteristics of the temporal transition of the temperature measurement value are recorded (registered) in recording unit 15 for individual cases as described later, and the state of a processing target material can be determined based on the characteristics.

Figure 2:
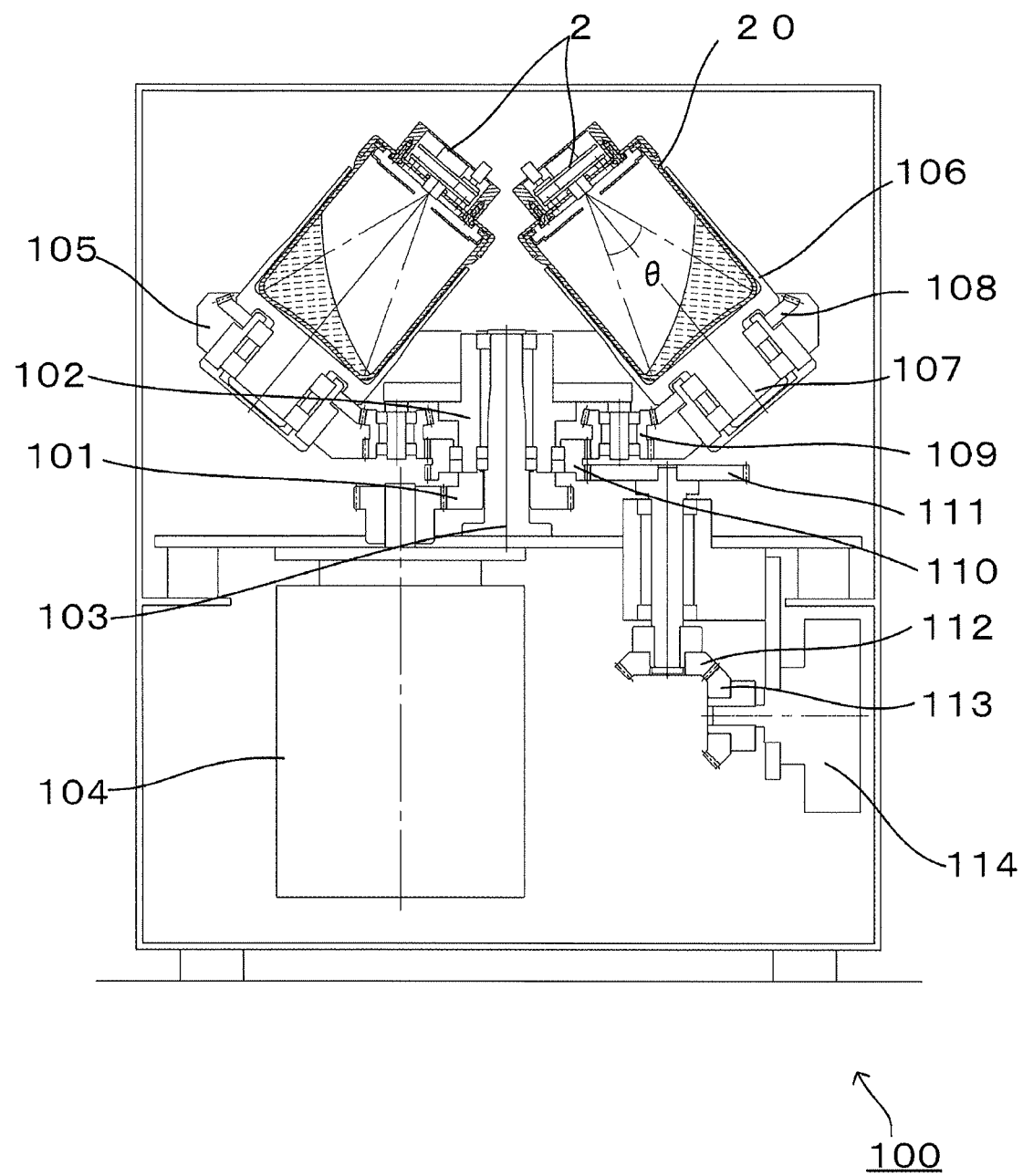
FIG. 2 is a diagram showing an example of a configuration of a stirring-degassing apparatus that includes a temperature sensor unit.

FIG. 2 shows one embodiment in which sensor unit 2 is attached to stirring-degassing apparatus 100 to observe the state of a processing target material in real time.

Sensor unit 2 including temperature sensor 3 (infrared sensor) is installed on a lid portion of container 20 containing the processing target material, and output values of temperature sensor 3 are transmitted in real time, received by analysis unit 9, and stored as data in recording unit 15.

The following describes the principle of operation of an example of stirring-degassing apparatus 100 to which state monitoring system 1 is applied.

Turning drum 102 including revolution gear 101 is supported so as to be turnable relative to revolution shaft 103 (fixed shaft) via a bearing. Turning movement of motor 104 is transmitted via revolution gear 101 to turning drum 102, and turning drum 102 turns around revolution shaft 103.

Revolution table 105 is coupled (fixed) to turning drum 102 and turns together with turning drum 102.

Container holder 106 includes turning shaft 107 (rotation shaft) and turning shaft 107 is turnably supported by revolution table 105 via a bearing.

Therefore, container holder 106 turns (revolves) around revolution shaft 103 as a result of revolution table 105 turning.

Container holder 106 includes rotation gear 108. Rotation gear 108 engages with intermediate gear 109 that is turnably supported by revolution table 105 via a bearing. Furthermore, intermediate gear 109 engages with sun gear 110.

Sun gear 110 is arranged on the outer side of turning drum 102 and is supported so as to be turnable relative to turning drum 102 via a bearing.

Furthermore, sun gear 110 engages with gear 111. A braking force is transmitted from braking apparatus 114 such as a powder brake to gear 111 via gears 112 and 113 that engage with each other.

If the braking force is not applied from braking apparatus 114 (i.e., braking force is zero), sun gear 110 turns as a result of turning drum 102 turning.

If the braking force is transmitted from braking apparatus 114 via gear 111 to sun gear 110, the turning speed of sun gear 110 becomes lower than the turning speed of turning drum 102, and a difference arises between the turning speed of sun gear 110 and the turning speed of revolution table 105 coupled to turning drum 102. As a result, intermediate gear 109 turns relative to sun gear 110. Since intermediate gear 109 engages with rotation gear 108, rotation gear 108 turns and container holder 106 turns (rotates) around turning shaft 107.

Note that in the above-described example of the configuration of stirring-degassing apparatus 100, revolution and rotation of container holder 106 are caused using single driving motor 104, but the configuration of stirring-degassing apparatus is not limited to this example shown in FIG. 2.

For example, a configuration is also possible in which a driving motor for revolution and a driving motor for rotation are separately provided to cause revolution and rotation of container holder 106, and another configuration is also possible. This is because sensor unit 2 can be installed on container 20 and therefore can be applied to various existing stirring-degassing apparatuses.

Furthermore, data is transmitted between sensor unit 2 and analysis unit 9 using wireless communication, and therefore state monitoring system 1 can be applied to various existing stirring-degassing apparatuses.

In FIG. 2, two containers 20 are installed. As is the case with this example, it is possible to simultaneously perform stirring-degassing processing in containers 20 and simultaneously measure the temperature of processing target materials contained in containers 20.

Containers 20, i.e., sensor units 2, and single analysis unit 9 can be connected to each other using wireless communication in accordance with the above-described communication standards.

The volume of data transmitted in communication at a time is small, and therefore various communication standards such as IEEE 802.15.1 can be used as well as the above-described communication standards.

Temperature sensor 3 in sensor unit 2 has a measurement field that is determined by an angle θ. The measurement field is set within a range that is defined by a bottom portion of container 20, and the temperature of the processing target material within the measurement field can be measured. Accordingly, when temperature measurement is performed using temperature sensor 3, a change in the temperature within the measurement field can be reflected to a temperature measurement value.

Furthermore, an output value of temperature sensor 3 reflects the intensity of radiation light radiated from a measurement target material, and therefore the temperature of the processing target material can be determined from an output value of temperature sensor 3. In addition, other information such as the state of the processing target material can also be determined referring to an output value of temperature sensor 3. For example, the intensity of radiation light reflected to an output value of temperature sensor 3 depends on the emissivity of the measurement target material, and accordingly, if measurement targets have different emissivities, temperature sensor 3 outputs different temperature measurement values (output values) even if the temperature is the same. Therefore, not only the temperature is measured, but also the intensity of radiation light depending on the type and the state of a measurement target material is detected with an output value of temperature sensor 3. Although both a thermal temperature sensor and a quantum temperature sensor can be used as temperature sensor 3, in a case in which specific radiation light according to the processing target material is detected, a quantum temperature sensor of which dependence on the wavelength of light is strong can be preferably used.

Figure 3:
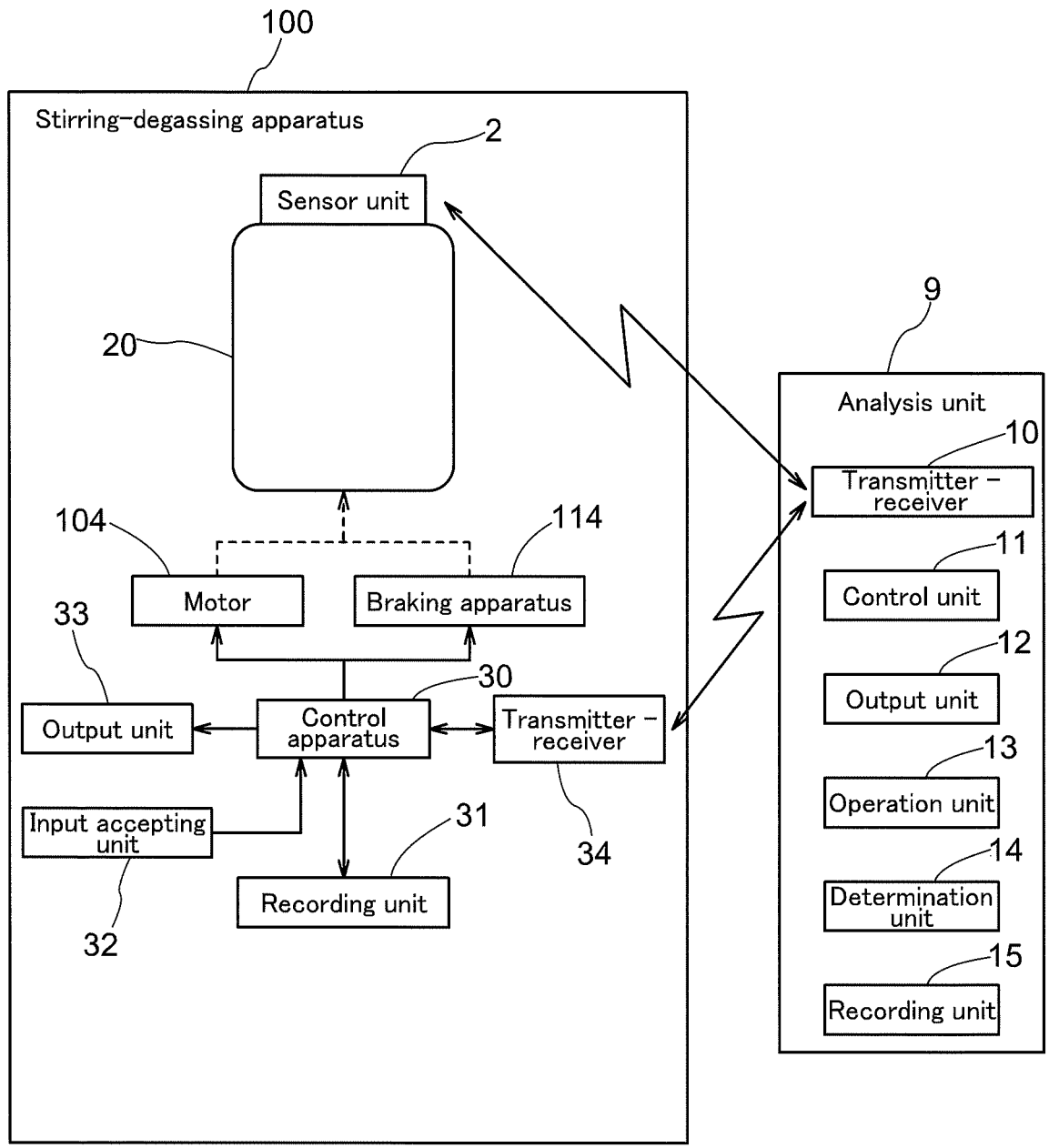
FIG. 3 is a diagram showing a main configuration of the state monitoring system and the stirring-degassing apparatus.

FIG. 3 is a diagram showing a main configuration of state monitoring system 1 and stirring-degassing apparatus 100. As shown in FIG. 3, container 20 containing a processing target material is installed in stirring-degassing apparatus 100 and sensor unit 2 is installed on a lid portion of container 20. Stirring-degassing apparatus 100 includes control apparatus 30, recording unit 31, input accepting unit 32, output unit 33, and transmitter-receiver 34, in addition to motor 104, braking apparatus 114, and the like shown in FIG. 2. Control apparatus 30 controls operations of motor 104 and braking apparatus 114 to revolve and rotate container 20. Recording unit 31 records information that is handled in stirring-degassing apparatus 100. Input accepting unit 32 can be realized using buttons and the like that an operator of stirring-degassing apparatus 100 uses when inputting an instruction to start or stop stirring-degassing processing, processing conditions, and the like. Output unit 33 can be realized using a display apparatus that can output textual information, a speaker that can output audio information, or an optical apparatus, such as one or more lumps, that can output optical information by turning light on or off, or through blink of light, for example. Transmitter-receiver 34 can be realized using an apparatus that communicates information with an external apparatus using wired communication or wireless communication. In the present embodiment, connection between transmitter-receiver 34 of stirring-degassing apparatus 100 and transmitter-receiver 10 of analysis unit 9 may be either wired connection or wireless connection.

Although details will be described later, in state monitoring system 1 of the present embodiment, a phenomenon that may appear in output values of temperature sensor 3 during stirring-degassing processing and content of post-comparison determination processing performed by determination unit 14 according to the phenomenon are associated with each other in information that is recorded in recording unit 15 of analysis unit 9. For example, if the operator performs stirring-degassing processing on processing target materials of one type every time under the same processing conditions, it is sufficient to store, in recording unit 15 of analysis unit 9, only information in which a phenomenon that may appear in output values of temperature sensor 3 during stirring-degassing processing is associated with content of post-comparison determination processing performed by determination unit 14 according to the phenomenon. Determination unit 14 compares the information recorded in recording unit 15 and a specific phenomenon that has appeared in output values of temperature sensor 3 during stirring-degassing processing, and performs post-comparison determination processing according to the result of comparison.

Alternatively, in state monitoring system 1 of the present embodiment, stirring-degassing processing information that includes at least one of processing target material information and processing condition information regarding stirring-degassing processing, a phenomenon that may appear in output values of temperature sensor 3 during stirring-degassing processing, and content of post-comparison determination processing performed by determination unit 14 according to the phenomenon are associated with each other in information that is recorded in recording unit 15 of analysis unit 9. For example, if the operator performs stirring-degassing processing on processing target materials of different types under different processing conditions, stirring-degassing processing information that includes at least one of processing target material information and processing condition information regarding the stirring-degassing processing also needs to be recorded. Determination unit 14 performs extraction processing for extracting, from information recorded in recording unit 15, information that corresponds to stirring-degassing processing information regarding stirring-degassing processing, which is set prior to execution of the stirring-degassing processing, compares the information extracted from recording unit 15 through the extraction processing and a specific phenomenon that has appeared in output values of temperature sensor 3 during stirring-degassing processing, and performs post-comparison determination processing according to the result of comparison.

In the above-described state monitoring system 1, post-comparison determination processing is processing for determining the state or state transition of the processing target material according to a specific phenomenon that has appeared in output values of temperature sensor 3 during stirring-degassing processing.

Alternatively, post-comparison determination processing is processing for taking an action according to a specific phenomenon that has appeared in output values of temperature sensor 3 during stirring-degassing processing. The action may also be set according to a state or state transition of the processing target material corresponding to a specific phenomenon that has appeared in output values of temperature sensor 3 during stirring-degassing processing. For example, the action means outputting an alarm from output unit 12. Alternatively, the action means recording that stirring-degassing processing has been normally executed or has not been normally executed, or recording that a phenomenon that is recorded in recording unit 15 and may appear in output values of temperature sensor 3 during stirring-degassing processing could not be detected in output values of temperature sensor 3 obtained in stirring-degassing processing.

Alternatively, action means determining an operation instruction for stirring-degassing apparatus 100. Examples of operation instructions that are determined in the action are listed below. Furthermore, action may also be performed by recording an operation instruction for stirring-degassing apparatus 100.

Increasing, reducing, or maintaining the revolution speed of container 20.

Increasing, reducing, or maintaining the rotation speed of container 20, or stopping rotation (i.e., stopping rotation and continuing revolution).

Stopping turning of container 20.

Increasing, reducing, or maintaining the degree of vacuum inside container 20.

Restoring the inside of container 20 to atmospheric pressure.

Heating or cooling the processing target material.

Replacing the atmosphere inside container 20 with nitrogen gas, argon gas, or the like.

Proceeding to the next step in stirring-degassing processing.

Proceeding to the next action.

State Monitoring Method

The following describes a method for monitoring the state of a processing target material using state monitoring system 1 in detail.

First, the reason why the state transition can be monitored using temperature measurement values will be described, and thereafter the method will be specifically described based on actual measurement cases.

The simplest change in the temperature of a processing target material is computed assuming that frictional heat steadily generated as a result of the turning movement of container 20 flows into the processing target material and heat flows out through heat conduction depending on a difference between the temperature (T) of the processing target material and an ambient temperature (Ta). The temperature (T(t)) of the processing target material can be expressed as: $T(t)=Ta+A(1-\exp(-\alpha t))$ (Expression 1). Here, A and a are constants and t represents time.

A deviation (difference) of a temperature change from this simplest model is considered to reflect a deviation from the simplest model of the state of the processing target material.

Therefore, causes of such deviation of a temperature change were considered and the following factors were found.

Heat Inflow

Other than frictional heat, heat may be generated during processing through a chemical reaction of the processing target material.

Frictional heat includes frictional heat generated through friction between container 20 and the processing target material and frictional heat generated inside the processing target material.

For example, if the processing target material is constituted by liquids and solids, frictional heat may be generated through friction between a liquid and a solid, between solids, or between liquids.

In a case in which the processing target material is constituted by a liquid and a solid (e.g., powder), contribution of frictional heat depends not only on the blending ratio of materials but also on the state of mixing at the time of stirring-degassing processing.

Frictional heat generated through friction between liquids is generated by shearing stress that acts in a tangential direction of a flow due to the viscosity of the liquids. The viscosity of a liquid depends not only on the state of mixing of the liquid with another liquid or a solid but also on the state of mixing of the liquid with gas (bubbles).

Even if the processing target material is constituted by a liquid and solids, friction between solids occurs before a uniformly mixed state is achieved. Also, friction between solids and side walls of container 20 occurs.

Depending on the processing target material, a chemical reaction occurs, and heat is generated through the chemical reaction. There are cases in which a chemical reaction progresses while getting activation energy from frictional heat, or a temperature increase rate increases when the temperature of the processing target material reaches a value.

Heat Outflow

Outflow of heat occurs through conduction of heat from the processing target material to other substances such as container 20 and air, as well as the generation of heat of vaporization when the processing target material vaporizes.

Outflow of heat through heat conduction depends on the heat conductivity of the processing target material, but if the processing target material contains substances having different heat conductivities or the heat conductivity varies according to the state of mixing or as a result of bubbles being mixed in, ununiformity of the heat conductivity (e.g., ununiformity of the heat conductivity between a center portion and a peripheral portion of container 20) affects heat conduction.

Note that in a case in which the processing target material contains substances having different heat conductivities, examples of combinations of the substances include liquids having different heat conductivities, a liquid and a solid, and a liquid and gas (bubbles).

Therefore, studies were systematically undertaken on various processing target materials, and it was found that characteristics of the temporal transition of temperature measurement values depend on various configurations of the processing target materials and stirring-degassing conditions, there are patterns characteristic of the configurations and conditions, and the state of a processing target material can be quantitatively monitored in real time by actually measuring temporal transition (time dependency) of the temperature measurement value.

Furthermore, if combinations of processing target material information and processing information (hereinafter may be simply referred to as "processing target material information and processing information", and "processing information" may also be referred to as "processing condition information") are recorded (registered) in association with the temporal transition of temperature measurement values, and a database of analysis results and actions corresponding to processing target material information and processing information is made, the record and the database can be effectively used in determination of optimum conditions of stirring-degassing processing and maintenance, improvement, and control of the quality of products.

The following specifically describes relationships between processing target material information, processing information (information regarding conditions of stirring-degassing processing), analysis results, and action, using examples of typical cases.

Case 1

(1) Processing Target Material Information

Silicone 300,000 mm$^2$/s, total weight: 100 g (2) Processing Condition Information Normal pressure and reduced pressure (set pressure: 0.1 kPa)

Revolution speed: 1340 rpm, rotation speed: 1340 rpm (rotated in direction opposite to revolution direction)

(3) Analysis Result and Action

Figure 4:
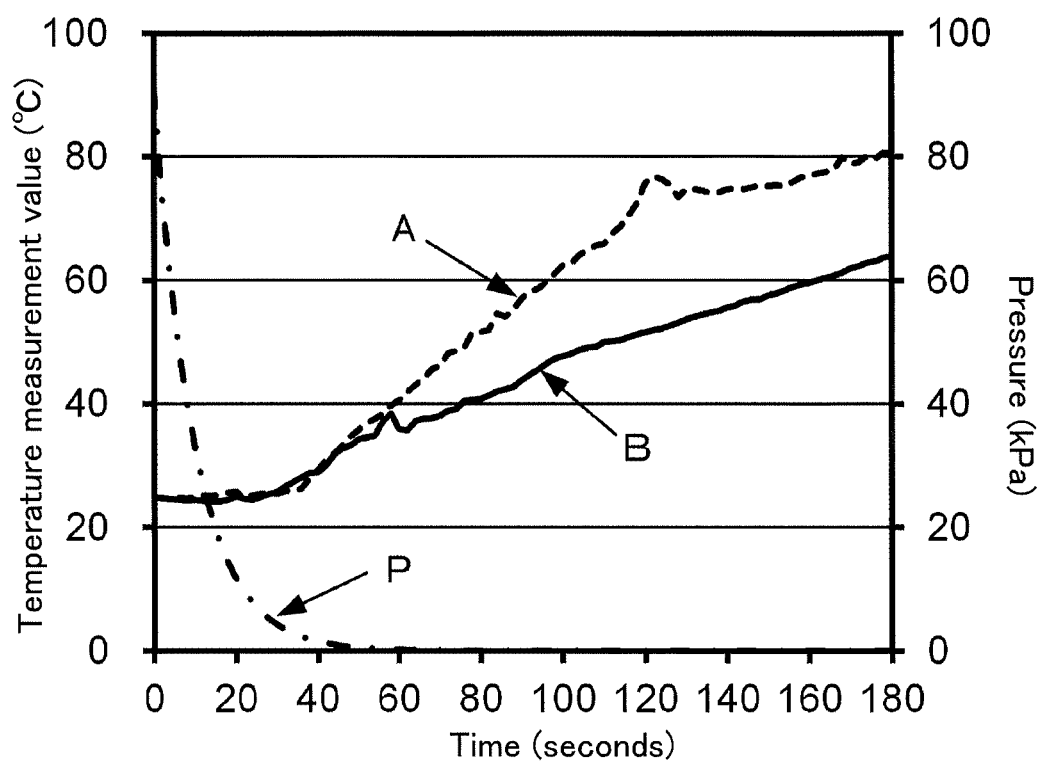
FIG. 4 is a graph showing temporal transition of temperature measurement values and pressure in case 1.

FIG. 4 shows temporal changes in temperature measurement values of a sample (sample A, shown by a dotted line in FIG. 4) subjected to stirring-degassing processing (simply referred to processing) under normal pressure and a sample (sample B, shown by a solid line in FIG. 4) subjected to processing under reduced pressure, in comparison. A dash-dot line P in FIG. 4 shows pressure during processing.

Note that the origin (0) of time indicated by a horizontal axis of the graph is a time point at which measurement was started and does not necessarily match a time point at which turning of container 20 was started. This also applies to other graphs.

It can be found that in the case of the sample A subjected to processing under normal pressure, characteristics of the temporal transition of the measured temperature changed when the time was 120 seconds.

On the other hand, the sample B subjected processing under reduced pressure does not have such a change point (i.e., a point at which characteristics of the temporal transition of the output value of temperature sensor 3 change).

Therefore, image data obtained through stroboscopic photography was checked to examine what kind of state transition occurred depending on the processing time.

Figure 5:
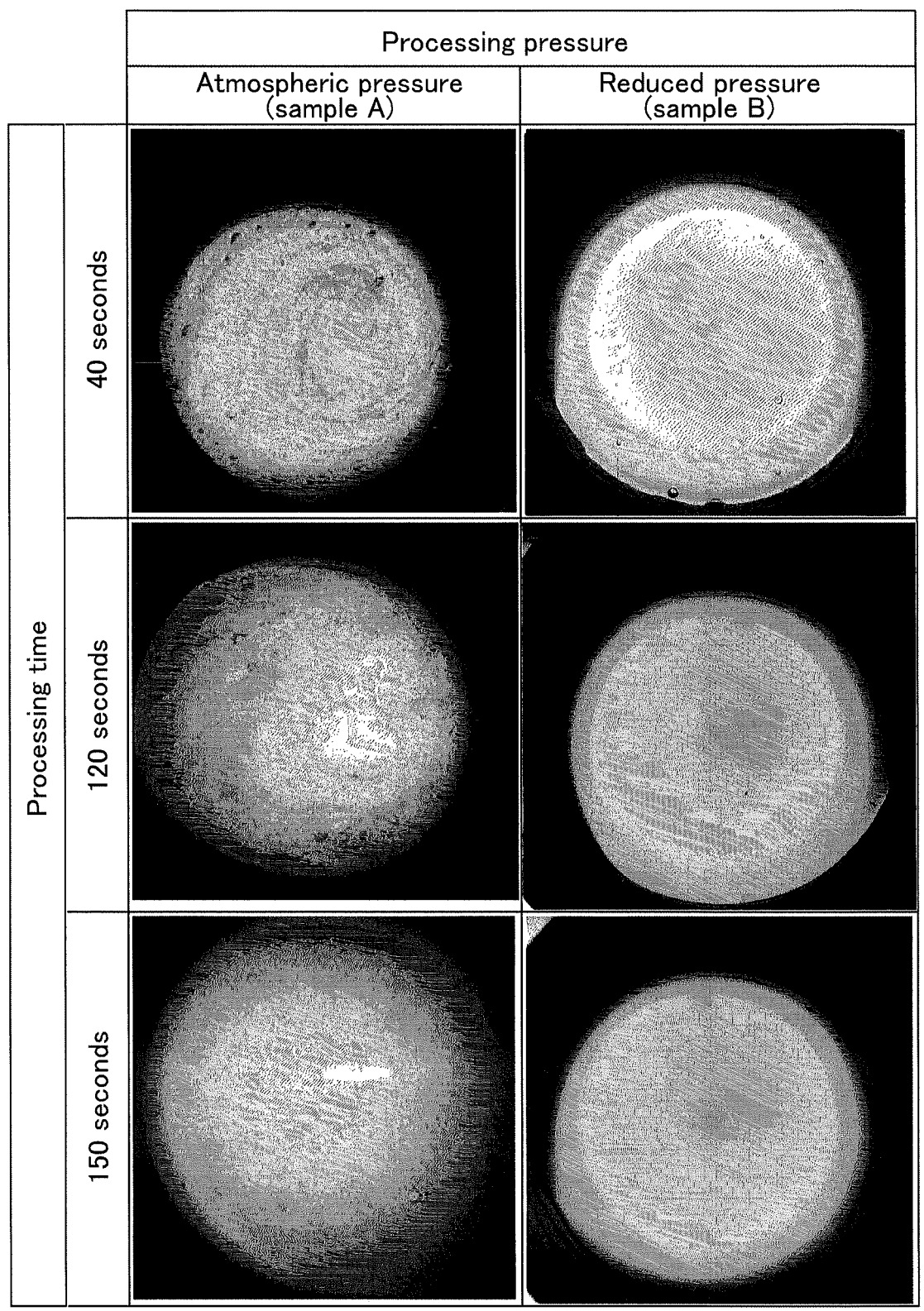
FIG. 5 shows surface photographs of samples A and B in case 1.

FIG. 5 shows surface photographs of the samples A and B obtained through stroboscopic photography at respective times, in comparison.

In the case of the sample A, minute bubbles are recognized in a photograph taken when the time was 40 seconds, and the number of minute bubbles is increased in a photograph taken when the time was 120 seconds. In a photograph taken when the time was 140 seconds, minute bubbles are spread over the entire sample and the entire sample is clouded.

On the other hand, in the case of the sample B, a small number of minute bubbles are recognized in a photograph taken when the time was 40 seconds, but the number is apparently small when compared to that in the sample A, and no bubble is recognized in photographs taken when the time was 120 seconds and 140 seconds.

Bubbles are usually mixed in when a liquid is stirred. The fluidity of bubbles forming a spiral, which were seen in the sample A up to around 120 seconds, is high. In this state, the viscosity is reduced as a result of bubbles deforming and deformation resistance due to surface tension disappearing. Such a rheological property increases the fluidity of the sample A. If a liquid includes a region in which many bubbles are contained and a region in which few bubbles are contained, the viscosity varies between the regions. Therefore, in a boundary portion between these regions, a shearing force is increased, frictional heat is increased, and an increase rate of the temperature measurement value with respect to time (hereinafter simply referred to as "temperature increase rate") is increased.

On the other hand, when the entire liquid is saturated with bubbles, the above-described variation in the viscosity depending on positions is reduced, the shearing force is reduced, frictional heat generated inside the liquid is reduced, and the temperature increase rate is reduced.

It can be understood that a change in the temperature measurement value reflects the state or state transition of the processing target material, such as a change in the viscosity, a change in the fluidity, or ununiformity of the fluidity due to bubbles. Therefore, determination unit 14 can perform post-comparison determination processing by determining the state or state transition of the processing target material according to a specific phenomenon that has appeared in output values of temperature sensor 3 during stirring-degassing processing.

On the other hand, the temperature increase rate of the sample B is lower than that of the sample A as shown in FIG. 4. Silicone has an extremely low saturated vapor pressure and a cooling effect due to heat of vaporization is ignorable, and therefore the low temperature increase rate suggests that the shearing force is small and the generation of frictional heat is small.

Actually, FIG. 5 shows that bubbles were kept from being mixed into the sample B, and this is consistent with the behavior of temporal transition of the temperature measurement value.

If a phenomenon that may appear in output values of temperature sensor 3 during stirring-degassing processing, for example, a time that corresponds to a change point of the temperature measurement value, a temperature increase rate, or the like is registered in recording unit 15, as a portion of information regarding analysis results and actions in association with processing target material information and processing condition information, various kinds of action can be performed as described below when a processing target material is processed, by using the registered time of the change point of the temperature measurement value or the registered temperature increase rate to perform determination or comparison with a value (may also be referred to as a threshold value or a set value in the present embodiment) that is appropriately set to determine whether or not the phenomenon appeared. That is, determination unit 14 can perform post-comparison determination processing by taking an action according to a specific phenomenon that has appeared in output values of temperature sensor 3 during stirring-degassing processing.

For example, if the temperature increase rate is monitored and found to be higher than a threshold value, it is possible to determine that the temperature is largely increased due to mixing of bubbles into the processing target material and take an action such as outputting an alarm from output unit 12.

Note that the temperature increase rate can be calculated by determining an average temperature increase rate in a predetermined period (e.g., inclination of a linear approximation formula of correlation between time and temperature measurement value in the past five seconds). The threshold value can be set with a margin, based on a temperature increase rate obtained from FIG. 4, for example.

Also, if the temperature increase rate is monitored and found to be equal to or lower than the threshold value, it is possible to continuously acquire the temperature measurement value until the end of stirring-degassing processing and take an action by recording normal completion of the processing in recording unit 15.

Note that if stirring-degassing processing is controlled using temperature measurement values, i.e., output values of temperature sensor 3, rather than time, control can also be performed based on a change in a physical state.

Furthermore, the degree of uniformity of the viscosity can be detected, and therefore application to uniform foaming processing is also possible. In this case, if it is determined (detected) that the temperature increase rate has temporarily increased (become equal to or higher than a first threshold value) as a result of bubbles being mixed in and then decreased (become equal to or lower than a second threshold value) as a result of bubbles being uniformly mixed, it is possible to determine that uniform foaming processing is complete and take an action by determining an operation instruction for stirring-degassing apparatus 100 to stop stirring-degassing processing and outputting the operation instruction to stirring-degassing apparatus 100, or recording that stirring-degassing processing has been normally executed, in recording unit 15. In contrast, if the specific phenomenon in which the temperature increase rate temporarily increases (becomes equal to or higher than the first threshold value) and then decreases (becomes equal to or lower than the second threshold value) as a result of bubbles being uniformly mixed is not determined (detected), determination unit 14 may also record, in recording unit 15, that the specific phenomenon that is recorded in recording unit 15 and may appear in output values of temperature sensor 3 during stirring-degassing processing could not be detected in output values of temperature sensor 3 obtained in stirring-degassing processing.

Note that similar determinations and actions can be performed for uniform emulsification processing as well.

The above-described action is registered in association with combinations of processing target material information and processing condition information, for example, a combination of "silicone 300,000 $mm^2$/s, total weight: 100 g" and "normal pressure, revolution speed: 1340 rpm, rotation speed: 1340 rpm (rotated in direction opposite to revolution direction)" and a combination of "silicone 300,000 $mm^2$/s, total weight: 100 g" and "reduced pressure (set pressure: 0.1 kPa), revolution speed: 1340 rpm, rotation speed: 1340 rpm (rotated in direction opposite to revolution direction)". Once analysis results and actions corresponding to processing target material information and processing condition information are registered in recording unit 15, state monitoring system 1 can execute an appropriate action according to a temporal change in temperature measurement values acquired in real time and content of the action registered in association with processing target material information and processing condition information, in mass production of products, for example. The same also applies to the following cases.

If determination is performed based on image data as described with reference to FIG. 5, the operator is required to always check images and momentarily determine an action, but this is practically impossible.

If temperature measurement values of temperature sensor 3 are used as described above, quantitative data can be easily obtained and content of a registered action can be automatically executed.

If analysis is performed using image data in a development stage and content of an action corresponding to temperature measurement values of temperature sensor 3 is registered in advance as described above, the action can be automatically executed in a mass production stage.

Also, technology of a stirring-degassing method can be easily transferred from a development department to a production department as a result of the content of the action being established. Furthermore, as a result of action being executed using a computer, variations in determination depending on operators are eliminated and quality can be stably maintained and controlled.

Information that indicates content of post-comparison determination processing performed by determination unit 14 may also be output from output unit 12 of analysis unit 9. That is, it is also possible to output, from output unit 12, information regarding a determination result regarding the state or state transition of the processing target material according to a specific phenomenon that has appeared in output values of temperature sensor 3 or content of an action performed according to the specific phenomenon that has appeared in the output values of temperature sensor 3. As a result, if the operator obtains information output from output unit 12, for example, the operator can know information such as the above-described determination result or content of the action.

In this case, output unit 12 can output the information by using audio information or textual information, turning a light on or off, or through blinking of a light. A configuration is also possible in which output unit 12 records the information in a recording medium, and the operator refers to the information later or receives the information via a communication means or the like.

Case 2

(1) Processing Target Material Information

Mixture of spherical graphite (30 g) and IPA (10 g) IPA (isopropyl alcohol) having high volatility was used as a solvent.

(2) Processing Condition Information

Normal pressure and reduced pressure (set pressure: 3 kPa)

Revolution speed: 1340 rpm, rotation speed: 1340 rpm (rotated in direction opposite to revolution direction)

(3) Analysis Result and Action

Figure 6:
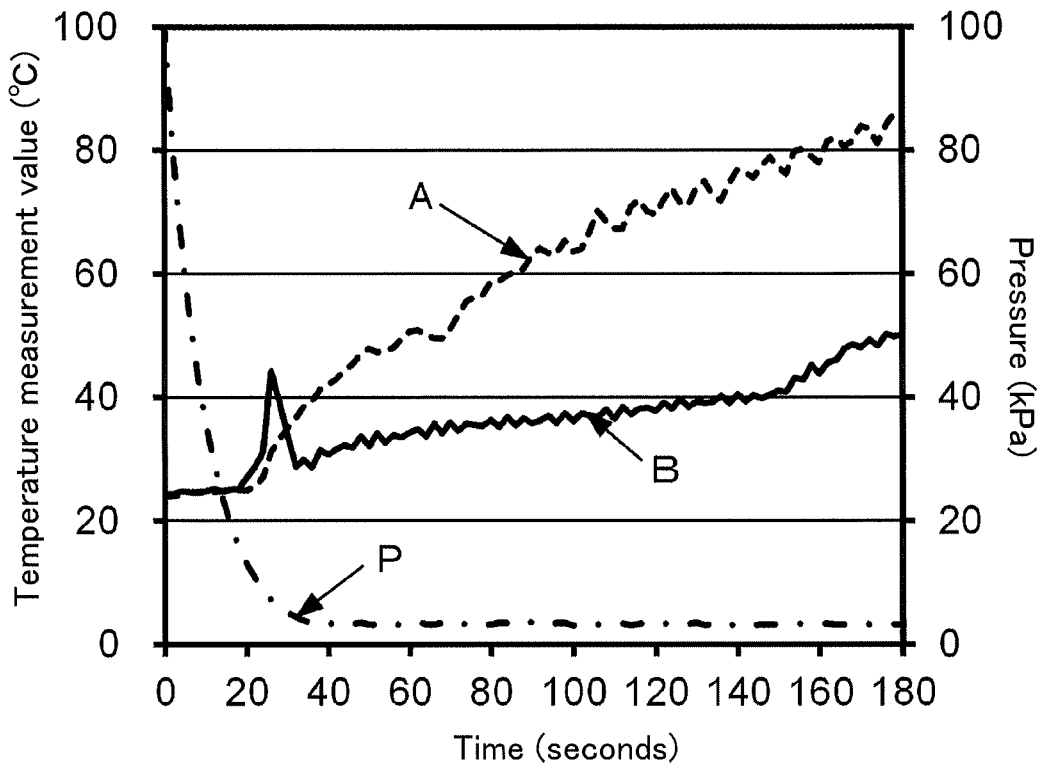
FIG. 6 is a graph showing temporal transition of temperature measurement values and pressure in case 2.

FIG. 6 shows changes in temperature measurement values of a sample (sample A, shown by a dotted line in FIG. 6) subjected to processing under normal pressure (atmospheric pressure) and a sample (sample B, shown by a solid line in FIG. 6) subjected to processing under reduced pressure, in comparison. A dash-dot line P in FIG. 6 shows pressure during processing.

In the case of the sample B subjected to processing under reduced pressure, a peak was recognized around 25 seconds. This is because gas contained in IPA was emitted as bubbles at the same time and the fluidity largely varied. If bubbles are generated at the same time, the volume expands, a surface of the processing target material swells, the distance to temperature sensor 3 varies, and the emissivity also varies due to the bubbles. Temperature sensor 3 can sensitively detect such a change.

This result shows that if processing is performed under reduced pressure using a solvent having high volatility, the state suddenly changes immediately after the processing is started.

Thereafter, the temperature of the sample B was kept lower than the temperature of the sample A due to heat of vaporization, and the temperature increase rate increased from when the time was 150 seconds. This is because when the time was 150 seconds, contribution of frictional heat generated through friction between spherical graphite particles was increased as a result of evaporation of IPA. After the temperature increase rate became at least a set value, a temperature reduction rate also became at least a set value.

As described above, the state or state transition of the processing target material, such as a state in which bubbles are generated from the solvent or a state in which the solvent disappears through vaporization (a situation in which friction occurs between solids), can be recognized from a change in the temperature measurement value measured by temperature sensor 3. Also, a state in which heat of vaporization is generated (a state of vaporization of the solvent) can be recognized with an elapsed time. As described above, if a magnitude of a change rate of the output value of temperature sensor 3 has become at least a set value during stirring-degassing processing of a processing target material, determination unit 14 can determine that vaporization of a substance contained in the processing target material has occurred. Note that vaporization includes evaporation that is a phase transition phenomenon from a liquid phase to a gas phase, and sublimation that is a phase transition phenomenon from a solid phase to a gas phase.

It is possible to register a time (or a temperature measurement value) based on the above-described result in recording unit 15, as a portion of information regarding analysis results and actions in association with processing target material information and processing conditions, and take an action by controlling stirring-degassing processing based on the registered time (or temperature measurement value). That is, determination unit 14 can perform post-comparison determination processing by taking an action according to a specific phenomenon that has appeared in output values of temperature sensor 3 during stirring-degassing processing. For example, determination unit 14 determines an operation instruction for stirring-degassing apparatus 100 to complete processing within a processing time of 150 seconds, and transmits the operation instruction from transmitter-receiver 10 to stirring-degassing apparatus 100. In stirring-degassing apparatus 100, transmitter-receiver 34 receives the operation instruction and control apparatus 30 controls operations of motor 104 and braking apparatus 114 according to the operation instruction.

Also, the importance of control of a gas exhausting speed (depressurizing speed) can be understood from the above-described changes in the temperature measurement value. The gas exhausting speed can be adjusted by controlling the turning speed of a vacuum pump, the degree of opening of a valve of an air inlet provided at an intermediate position of an exhaust line, or the like.

As described above, it is also possible to take an action by determining an operation instruction for stirring-degassing apparatus 100 to control the gas exhausting speed of an exhaust system (not shown) of stirring-degassing apparatus 100 according to processing target material information, and outputting the operation instruction to stirring-degassing apparatus 100.

If the peak around 25 seconds is not detected and the temperature increase rate does not change thereafter in processing performed under reduced pressure, it is also possible to take an action by recording, in recording unit 15, history indicating that stirring-degassing processing has been normally executed.

As described above, if temperature sensor 3 is used, it is possible to detect times that correspond to change points of the state of the processing target material and measure the times corresponding to the change points, through a single experiment.

In conventional methods, nine samples are prepared for every 20 seconds within a range from 20 seconds to 180 seconds, and based on results of processing performed on the samples, it is presumed the state changes within a range from 20 seconds to 40 seconds and within a range from 140 seconds to 160 seconds.

That is, if state monitoring system 1 according to the present invention is used, the number of samples can be reduced to one ninth and times can be more precisely identified, and therefore a development cost and a development period can be reduced in the development stage.

Furthermore, similarly to the above-described case 1, information indicating content of post-comparison determination processing performed by determination unit 14 may also be output from output unit 12 of analysis unit 9. That is, it is also possible to output, from output unit 12, information regarding a determination result regarding the state or state transition of the processing target material according to a specific phenomenon that has appeared in output values of temperature sensor 3 or content of an action performed according to the specific phenomenon that has appeared in the output values of temperature sensor 3.

Case 3

(1) Processing Target Material Information

Animal glue 40 g+water 40 g (2) Processing Condition Information

Reduced pressure (set pressure: 5 kPa) Revolution speed: 1340 rpm, rotation speed: 297 rpm (rotated in direction opposite to revolution direction) (secondary stirring)

(3) Analysis Result and Action

Figure 7:
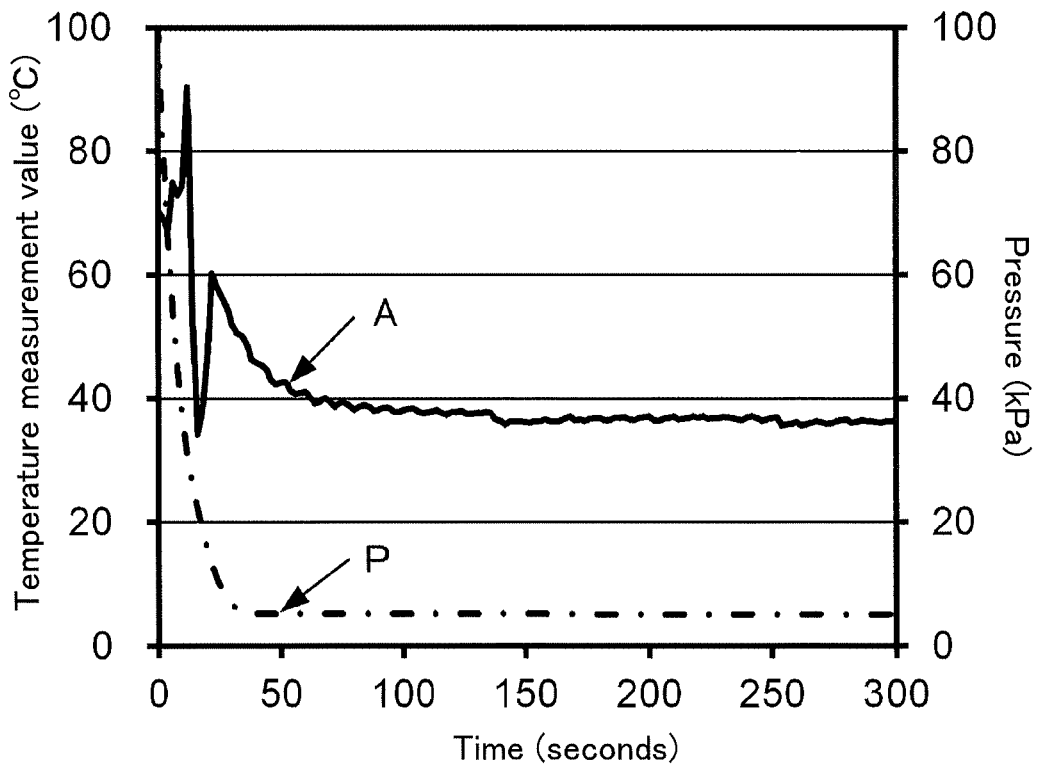
FIG. 7 is a graph showing temporal transition of a temperature measurement value and pressure in case 3.

FIG. 7 shows changes in the temperature measurement value of a sample (sample A shown by a solid line in FIG. 7) subjected to processing under reduced pressure. A dash-dot line P in FIG. 7 shows pressure during processing.

Note that this sample was emulsified in advance through primary stirring (performed under normal pressure, revolution speed: 1340 rpm, rotation speed: 1340 rpm (rotated in direction opposite to revolution direction)).

FIG. 7 shows that the temperature measurement value fluctuated up and down from immediately after the start of the processing to around 30 seconds. Also, a change point (a reduction of about 3° C.) in the temperature measurement value is observed around 140 seconds.

Not only temporal transition of the temperature measurement value but also a time corresponding to the above-described change point is registered as a portion of information regarding analysis results and actions in recording unit 15.

Figure 8:
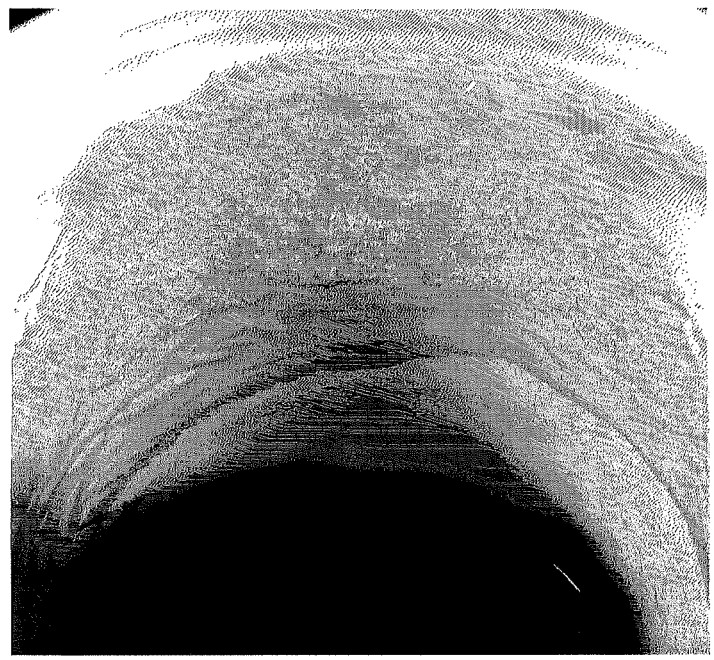
FIG. 8 shows surface photographs of a sample in case 3.
Figure 8:
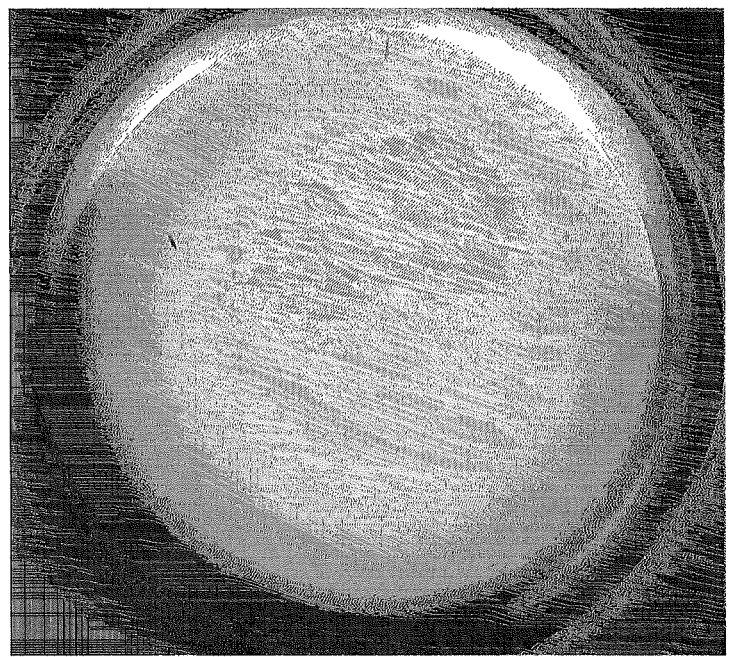

FIGS. 8(*a*) and 8(*b*) show surface photographs of the sample taken through stroboscopic photography when the time was 30 seconds and 140 seconds.

From FIG. 8(*a*), it can be found that when the time was 30 seconds, a portion of the sample adhered to a side wall surface of container 20. That is, it can be found that violent bumping occurred as a result of secondary stirring being performed under reduced pressure on the sample in which a large volume of bubbles had been mixed in through primary stirring.

It can be understood that, around 30 seconds, temperature sensor 3 detected radiation light radiated from glue and container 20, which have different emissivities, and further detected a state in which the emissivity of glue varied under the influence of bubbles and radiation light radiated from glue varied.

The above-described fluctuation of the temperature measurement value indicates that temperature sensor 3 has the ability to detect large variation in the state of the processing target material. This ability is derived from a characteristic of temperature sensor 3 of being able to detect a difference (variation) in a physical property value, i.e., the emissivity, of each substance as a difference (variation) in the intensity of radiation light. Also, temperature sensor 3 has high responsiveness, and therefore can sensitively detect state transition in such a short time.

It can be recognized from FIG. 8(*b*) that when the time was 140 seconds, gelation proceeded from the vicinity of a position at which container 20 was in contact with the sample.

Therefore, it is thought that a change point in the temperature measurement value around 140 seconds reflects a state or state transition of the processing target material in which the fluidity of the processing target material was reduced through the progression of gelation, the generation of frictional heat was reduced as a result of a reduction in shearing stress, and the temperature was reduced through the generation of heat of vaporization. Therefore, determination unit 14 can perform post-comparison determination processing by determining the state or state transition according to a specific phenomenon that has appeared in output values of temperature sensor 3 during stirring-degassing processing.

From the above-described result, it can be understood that the depressurization speed (the speed of gas exhaustion performed using a vacuum pump) needs to be optimized to prevent bumping when depressurization is started. The depressurization speed can be quantitatively optimized using a variation amount of the temperature measurement value, for example, a difference between a local maximum value and a local minimum value, as a parameter. This facilitates determination of conditions of the depressurization speed, and avoids a situation in which the depressurization speed is excessively reduced and the processing time is unnecessarily elongated.

Also, if the above-described variation amount has exceeded a predetermined threshold value in processing of the processing target material, it is possible to determine that bumping has occurred and take an action by outputting an alarm or recording, in recording unit 15, history indicating that stirring-degassing processing has not been normally executed. If the variation amount has been equal to or smaller than the threshold value, it is possible to take an action after completion of stirring-degassing processing by displaying normal completion of stirring-degassing processing or recording, in recording unit 15, history indicating that stirring-degassing processing has been normally executed. That is, determination unit 14 can perform post-comparison determination processing by taking an action according to a specific phenomenon that has appeared in output values of temperature sensor 3 during stirring-degassing processing.

Furthermore, the time it takes for the occurrence of gelation can be known, and therefore the processing time can be set to be shorter than the time it takes for the occurrence of gelation. For example, if the operator has set a time that is longer than the time it takes for the occurrence of gelation, as a processing condition, it is also possible to take an action by outputting an alarm from output unit 12.

If a change point of the temperature measurement value (a reduction in the temperature measurement value) is detected, it is also possible to determine that gelation has occurred and output alarm or record alarm as history in recording unit 15.

It is also possible to take an action by registering a lot number of a product in association with processing history (temperature measurement value, the presence or absence of alarm) in a recording apparatus to enable quality control. Such quality control performed using a lot number of a product and processing history can be performed in other cases as well.

Furthermore, similarly to the above-described cases, information indicating content of post-comparison determination processing performed by determination unit 14 may also be output from output unit 12 of analysis unit 9. That is, it is also possible to output, from output unit 12, information regarding a determination result regarding the state or state transition of the processing target material according to a specific phenomenon that has appeared in output values of temperature sensor 3 or content of an action performed according to the specific phenomenon that has appeared in the output values of temperature sensor 3.

Case 4

(1) Processing Target Material Information

Epoxy resin main agent 100 g+curing agent 20 g (2) Processing Condition Information Reduced pressure (set pressure: 0.1 kPa)

Revolution speed: 1340 rpm, rotation speed: 1340 rpm (rotated in direction opposite to revolution direction)

(3) Analysis Result and Action

Figure 9:
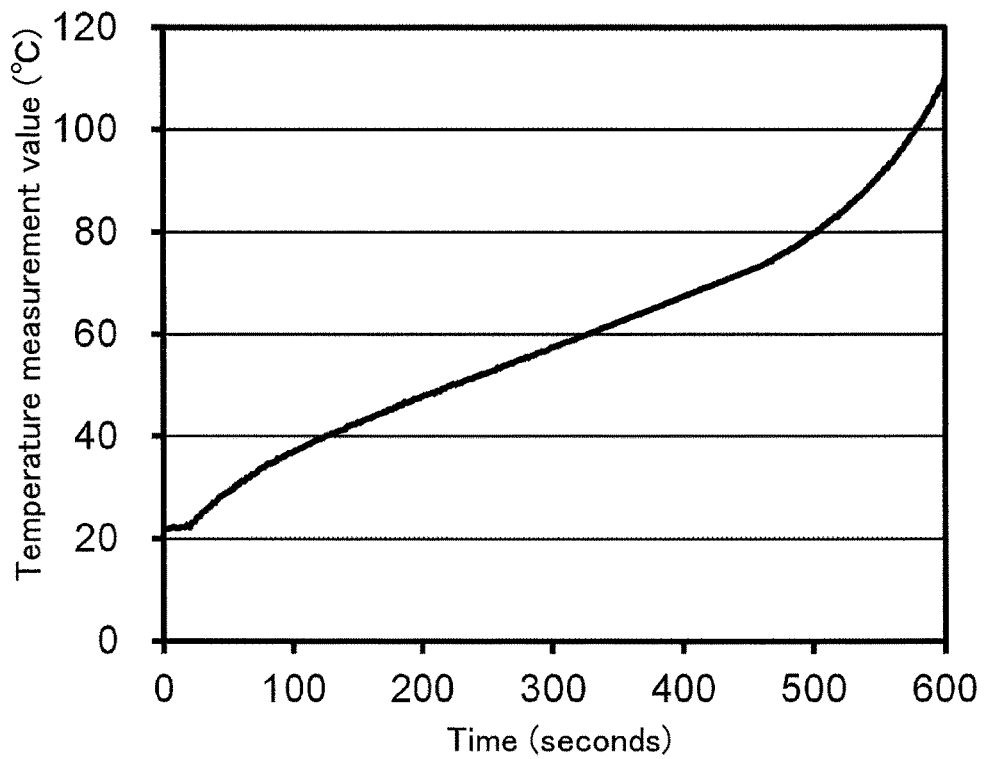
FIG. 9 is a graph showing temporal transition of a temperature measurement value in case 4.

FIG. 9 shows temporal transition of the temperature measurement value of this sample. It can be found that the temperature measurement value was gradually and nonlinearly increased up to around 150 seconds, linearly increased from around 150 seconds to around 450 seconds, and thereafter nonlinearly and rapidly increased.

Not only temporal transition of the temperature measurement value but also times at which the temperature increase rate changed and the increase rate of the temperature measurement value can be registered as a portion of information regarding analysis results and actions in recording unit 15.

Such behavior of the temperature measurement value was caused as a result of the temperature being increased through stirring, a chemical reaction (crosslinking reaction) of epoxy resin being activated from around 75° C., and the temperature being rapidly increased due to heat of reaction. Furthermore, it is thought that the temperature measurement value was increased because the viscosity of epoxy resin became ununiform as a result of being increased in a region in which crosslinking of epoxy resin progressed, and frictional heat was increased due to shearing stress.

Note that frictional heat tends to decrease when crosslinking reaction ends and epoxy resin is solidified, although this is not shown in FIG. 9.

As described above, a time (or a temperature) at which crosslinking reaction of a resin starts can be easily measured based on a change point in the temperature measurement value through measurement performed once, even if the resin is a novel resin. That is, it can be said that the state or state transition of the processing target material can be determined from the temperature measurement value. Therefore, determination unit 14 can perform post-comparison determination processing by determining the state or state transition according to a specific phenomenon that has appeared in output values of temperature sensor 3 during stirring-degassing processing. Accordingly, it is possible to register an upper limit of a stirring processing time (temperature) according to resin, and set the processing time to be not longer than the upper limit.

If the temperature measurement value has exceeded an upper limit value in processing of the resin, analysis unit 9 of state monitoring system 1 can execute action by outputting an alarm and recording the occurrence of alarm as processing history in recording unit 15, and if the temperature measurement value has been equal to or lower the upper limit value, analysis unit 9 of state monitoring system 1 can execute action by recording, in recording unit 15, processing history indicating that stirring-degassing processing has been normally executed. If the temperature measurement value has exceeded the upper limit value, it is also possible to take an action by determining an operation instruction for stirring-degassing apparatus 100 to stop processing and outputting the operation instruction to stirring-degassing apparatus 100. That is, determination unit 14 can perform post-comparison determination processing by taking an action according to a specific phenomenon that has appeared in output values of temperature sensor 3 during stirring-degassing processing.

Furthermore, similarly to the above-described cases, information indicating content of post-comparison determination processing performed by determination unit 14 may also be output from output unit 12 of analysis unit 9. That is, it is also possible to output, from output unit 12, information regarding a determination result regarding the state or state transition of the processing target material according to a specific phenomenon that has appeared in output values of temperature sensor 3 or content of an action performed according to the specific phenomenon that has appeared in the output values of temperature sensor 3.

Case 5

(1) Processing Target Material Information

Alumina 70 g+silicone 10,000 mm$^2$/s 30 g, total weight: 100 g (2) Processing Condition Information Reduced pressure (set pressure: 0.1 kPa)

Revolution speed: 1340 rpm, rotation speed: 1340 rpm (rotated in direction opposite to revolution direction)

(3) Analysis Result and Action

Figure 10:
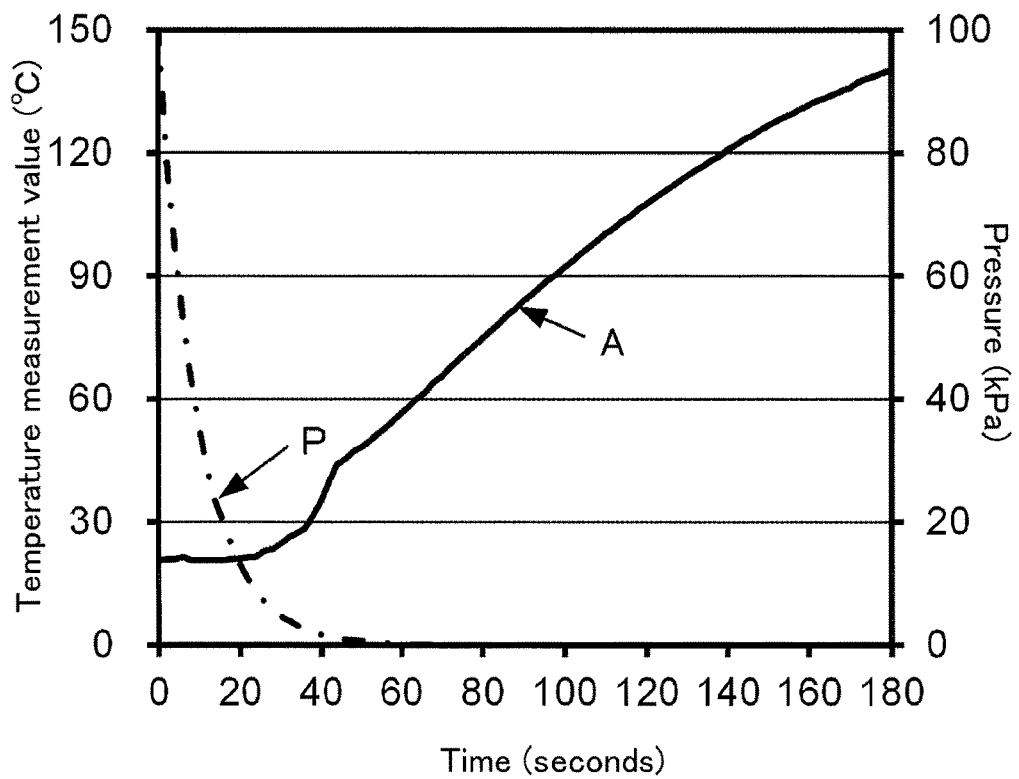
FIG. 10 is a graph showing temporal transition of a temperature measurement value and pressure in case 5.

FIG. 10 shows temporal transition of the temperature measurement value of this sample and pressure.

The temperature measurement value was nonlinearly increased after processing was started, had a change point around 44 seconds, thereafter was increased substantially linearly up to 100 seconds, and then increased while the increase rate was gradually reduced. Not only temporal transition of the temperature measurement value but also a time corresponding to the change point and the increase rate of the temperature measurement value are registered as a portion of information regarding analysis results and actions in recording unit 15.

Figure 11:
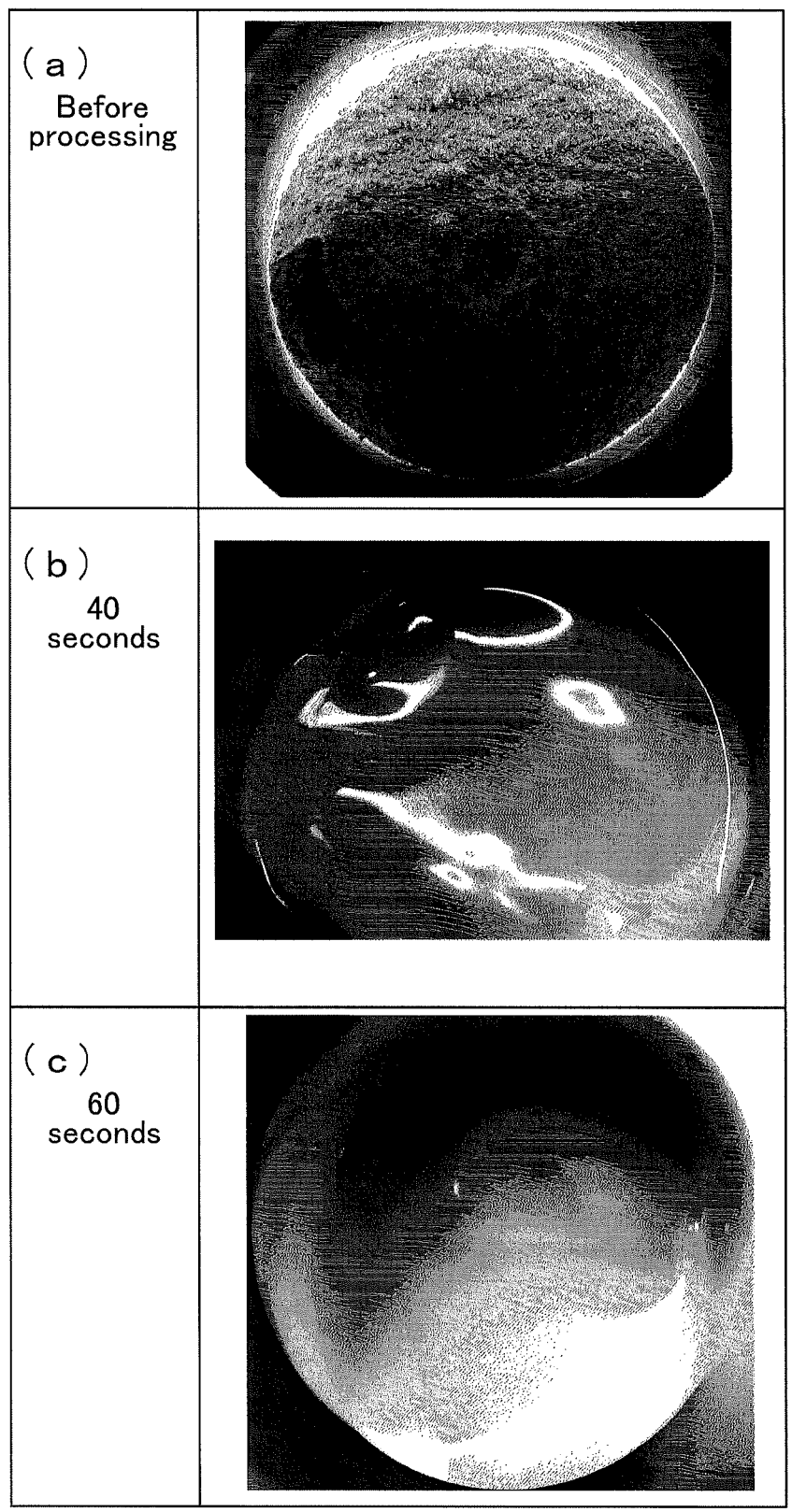
FIG. 11 shows surface photographs of a sample in case 5.

FIGS. 11(a), 11(b), and 11(c) show surface photographs of the sample taken through stroboscopic photography before the processing, when the time was 40 seconds, and when the time was 60 seconds. It can be found that when the time was 40 seconds, lumps were formed at least at the surface and the processing target material was not uniformly mixed. On the other hand, it can be found that when the time was 60 seconds, a uniformly mixed slurry including no lumps was obtained.

In a region that is in an ununiform state, the fluidity is disturbed, shearing stress is generated, and frictional heat is increased, and accordingly, the increase rate of the temperature measurement value becomes large, and when the processing target material is thereafter uniformly mixed, the temperature measurement value increases along a gentle curve. As described above, it can be said that the state or state transition of the processing target material can be determined from the temperature measurement value. Therefore, determination unit 14 can perform post-comparison determination processing by determining the state or state transition according to a specific phenomenon that has appeared in output values of temperature sensor 3 during stirring-degassing processing.

In order to obtain a homogeneous slurry from alumina and silicone, stirring needs to be performed for at least a time during which such lumps are generated. A homogeneous slurry is obtained through action that is performed by registering a time with which the state of stirring becomes poor, based on transition of the temperature measurement value, and setting the processing time to be not shorter than that time. That is, the minimum processing time can be determined. For example, it is also possible to set a processing condition for performing an action (i.e., determining an operation instruction for stirring-degassing apparatus 100) to further perform processing for 50 seconds after the above-described change point is detected. That is, determination unit 14 can perform post-comparison determination processing by taking an action according to a specific phenomenon that has appeared in output values of temperature sensor 3 during stirring-degassing processing.

If a time that corresponds to the above-described change point is longer than a threshold value, e.g., 60 seconds, that is set in advance, it is also possible to determine that the state in which lumps are generated has continued for a time equal to or longer than an allowable time, output alarm, and record alarm as processing history in recording unit 15.

It is also possible to set a threshold value (e.g., the largest value of actual values) based on actual values of the variation amount of the temperature measurement value, and perform an action by outputting an alarm if the variation amount of the temperature measurement value has exceeded the threshold value in processing of a lot of products, or recording that stirring-degassing processing has been normally executed as lot processing history in recording unit 15 if the variation amount is smaller than the threshold value.

Note that the variation amount of the temperature measurement value is evaluated using a variation amount at a change point of the temperature measurement value around 44 seconds, for example, and can be easily determined based on a difference between the largest temperature measurement value and the smallest temperature measurement value within a range from 30 seconds to 60 seconds, for example.

Furthermore, similarly to the above-described cases, information indicating content of post-comparison determination processing performed by determination unit 14 may also be output from output unit 12 of analysis unit 9. That is, it is also possible to output, from output unit 12, information regarding a determination result regarding the state or state transition of the processing target material according to a specific phenomenon that has appeared in output values of temperature sensor 3 or content of an action performed according to the specific phenomenon that has appeared in the output values of temperature sensor 3.

Case 6

Figure 12:
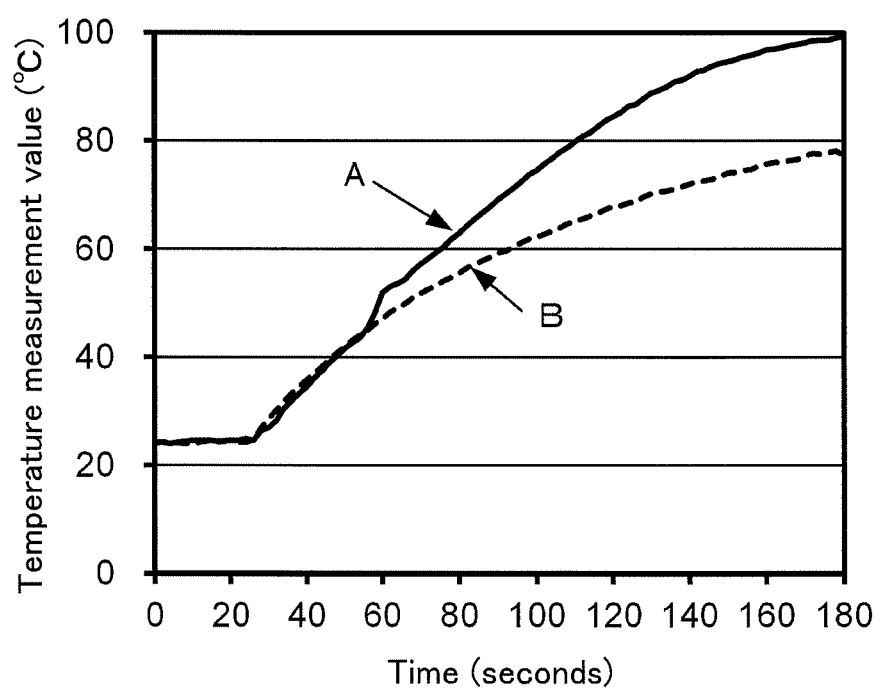
FIG. 12 is a graph showing temporal transition of temperature measurement values in case 6.

(1) Processing Target Material Information
Sample A: alumina 70 g+silicone 10,000 mm$^2$/s 30 g
Sample B: alumina 30 g+silicone 10,000 mm$^2$/s 70 g
(2) Processing Condition Information
Reduced pressure (set pressure: 0.1 kPa)
Revolution speed: 1340 rpm, rotation speed: 1340 rpm (rotated in direction opposite to revolution direction)
(3) Analysis Result and Action FIG. 12 shows temporal transition of temperature measurement values of samples A and B. The blending ratio of alumina in the sample A is higher than that in the sample B, and it can be found that the increase rate of the temperature measurement value varies due to the difference in the blending ratio of a material. For example, a peak is observed at 55 seconds in the temperature measurement value of the sample A, but this peak is not observed in the temperature measurement value of the sample B, and it can be found that temporal transition of the temperature measurement value varies according to the blending ratio of alumina.

Not only temporal transition of the temperature measurement value but also peak values (a time and a temperature measurement value) can be registered as a portion of information regarding analysis results and actions in recording unit 15.

It is thought that the peak was generated as a result of the blending ratio of alumina in the sample A being high and lumps being generated similarly to the case 5, but the generation of lumps was suppressed in the sample B in which the blending ratio of alumina was low.

Also, the sample A containing a larger amount of alumina had higher temperature measurement values, and it can be understood that the higher the blending ratio of alumina is, the larger the generation of heat through friction is.

As described above, a difference in the blending ratio of alumina can be detected from the temporal transition of the temperature measurement values. That is, if a temporal change in the output values of temperature sensor 3 that may appear during stirring-degassing processing is recorded in recording unit 15, determination unit 14 can determine similarity between the temporal change in the output values of temperature sensor 3 that is recorded in recording unit 15 and may appear during stirring-degassing processing, and a temporal change in output values of temperature sensor 3 that has appeared during stirring-degassing processing.

Furthermore, if the temperature measurement value is monitored, it is possible to detect an error in the blending ratio of a material and take an action by displaying an alarm, for example.

That is, analysis unit 9 executes an action by recording the presence or absence of a change point of the temperature measurement value and the increase rate of the temperature measurement value at a specific time, e.g., 80 seconds, in association with a lot number of a product to enable quality control.

Note that the specific time can be set to be longer than a time (55 seconds) corresponding to a change point that is registered in a database associated with processing target material information and processing condition information.

Furthermore, information indicating the result of similarly determined by determination unit 14 may also be output from output unit 12 of analysis unit 9.

Others

If stirring-degassing apparatus 100 includes containers 20 as shown in FIG. 2, it is also possible to compare temporal transition of temperature measurement values of the respective containers, determine the presence or absence of deviation from each other, and execute registered action.

For example, if samples of the same configuration, e.g., samples that are constituted by silicone and alumina and have the same blending ratio, are processed as processing target materials at the same time in different containers 20 of stirring-degassing apparatus 100, it is possible to monitor a difference between temperature measurement values of the respective samples in real time, and if the difference is larger than a predetermined threshold value, take an action by outputting an alarm and recording alarm information together with temperature measurement values as processing history in recording unit 15, and if the difference is not larger than the predetermined threshold value, take an action by recording normal completion as processing history in recording unit 15.

It is also possible to place a reference sample, e.g., a sample that is constituted by silicone and does not contain alumina, in one container 20, place an evaluation sample of another configuration, e.g., a sample that is constituted by silicone and contains alumina at a predetermined blending ratio, in another container 20, perform processing on these samples at the same time using stirring-degassing apparatus 100, measure temperatures of the respective samples, record temporal changes in temperature measurement values of the respective samples and a difference of the evaluation sample from the reference sample as processing history in recording unit 15, and if the difference has exceeded a predetermined threshold value, take an action by outputting an alarm and recording temperature measurement values together with alarm information as processing history in recording unit 15, and if the difference has been not larger than the predetermined threshold value, take an action by recording normal completion as processing history in recording unit 15.

If a sample that does not have a change point of the temperature measurement value is used as the reference sample and a difference between the reference sample and the evaluation sample is detected, a change point of the temperature measurement value can be more easily detected.

In this case, information regarding cases in which processing is performed in containers 20 can be registered as information regarding analysis results and actions, and the above-described actions in the case in which the processing target materials are the same and the case in which the processing target materials are different can be registered. Control unit 11 of analysis unit 9 can determine whether or not processing is performed on processing target materials and execute action for the case of a single processing target material, action for the case of processing target materials, or action for both cases, and the operator can select action before starting processing and instruct control unit 11 to execute the selected action.

If processing target materials processed at the same time are compared, the quality of the processing target materials can be controlled without being affected by variation in processing conditions.

Automatic Detection of Change Point

Temperature measurement values are quantitative data, and therefore a change point can be automatically detected when temperature measurement values are monitored in real time, and the best method for automatic detection can be selected according to processing condition information.

For example, an average increase rate of the temperature measurement value can be determined from the temporal transition of several temperature measurement values measured in the past, and a time at which the variation amount of the increase rate becomes larger than a threshold value can be taken to be a change point. Examples of other methods include the followings.

(i) An average value of the differential (difference) between several (at least three) temperature measurement values measured in the past among temperature measurement values already acquired from temperature sensor 3 is calculated, an inclination is determined, and determination is performed based on a change in the inclination.

(ii) An approximation straight line of several (at least three) temperature measurement values measured in the past is calculated using the method of least squares, an inclination is determined, and determination is performed based on a change in the inclination.

(iii) An area of difference from an asymptotic straight line is calculated as is the case with I in PID control, and determination is performed based on a change in the area.

(iv) Determination is performed based on a change in the distance from a point to the next point by using Lorenz plot used for a chaotic system.

Utilization of State Monitoring System 1

As described above, it was revealed that temporal transition of the temperature measurement value reflects state transition of the processing target material and depends on materials of the processing target material and the blending ratio of the materials.

Therefore, state monitoring system 1 can acquire information regarding temporal transition of the temperature measurement value according to processing target material information and processing condition information and effectively utilize the acquired information in development and production (mass production) of products.

(1) Product Development Stage

In a product development stage and an optimization stage for determining stirring-degassing processing conditions, state monitoring system 1 can be utilized in the following steps.

Step S1: Record Processing Target Material Information and Processing Condition Information Operation unit 13 of analysis unit 9 acquires stirring-degassing processing information that includes at least one of processing target material information and processing condition information, which is input by the operator from an input terminal, for example, and control unit 11 of analysis unit 9 records (registers) the acquired stirring-degassing processing information in recording unit 15.

Note that if stirring-degassing processing is performed on the same processing target material under the same processing conditions, stirring-degassing processing information does not necessarily have to be recorded (registered) in recording unit 15.

Step S2: Transmit Measurement Instruction

The operator instructs stirring-degassing apparatus 100 to start stirring-degassing processing and instructs state monitoring system 1 to start temperature measurement via operation unit 13. Upon acquiring the instruction to start temperature measurement, control unit 11 of analysis unit 9 transmits a measurement instruction to sensor unit 2 via transmitter-receiver 10, following the instruction to start temperature measurement.

The instruction to start temperature measurement can specify no only a time point at which measurement is started but also the frequency of measurement and a measurement period.

At this time, analysis unit 9 transmits the instruction to start temperature measurement to sensor unit 2 in accordance with known communication standards such as the above-described communication standards, but if there are containers 20 and sensor units 2, it is also possible to transmit the instruction to start temperature measurement together with identification numbers for identifying the respective sensor units 2 to measure the temperature under different measurement conditions, e.g., at different frequencies, in the respective containers 20.

Note that a configuration is also possible in which state monitoring system 1 acquires an instruction to start stirring-degassing processing from the operator via stirring-degassing apparatus 100, or to the contrary, an instruction to start stirring-degassing processing issued from the operator is output from state monitoring system 1 to stirring-degassing apparatus 100.

Step S3: Execute Temperature Measurement

Communication unit 5 of sensor unit 2 receives the instruction to start temperature measurement from analysis unit 9 via transmitter-receiver 8, acquires temperature measurement values from temperature sensor 3 at a predetermined frequency for a predetermined period using the time measurement function of clock unit 7, and records (stores) the temperature measurement values together with measurement times in recording unit 6.

Step S4: Record Temperature Measurement Value

Sensor unit 2 transmits the temperature measurement values recorded in recording unit 6, via transmitter-receiver 8.

Note that a configuration is also possible in which temperature measurement values are temporarily recorded in recording unit 6 of sensor unit 2 and deleted after being transmitted.

Analysis unit 9 receives the temperature measurement values via transmitter-receiver 10, and control unit 11 records the temperature measurement values and the measurement times in recording unit 15. That is, control unit 11 of analysis unit 9 performs output value recording processing for recording output values of temperature sensor 3 that are output during stirring-degassing processing and received by transmitter-receiver 10. At this time, the temperature measurement values and the measurement times may also be recorded in recording unit 15 in association with stirring-degassing processing information that includes at least one of already recorded processing target material information and already recorded processing condition information.

Note that if processing target materials contained in containers 20 are processed, information for identifying the processing target materials contained in respective containers 20 is further associated with the above information and recorded (registered) as a database in recording unit 15. For example, if containers 20 respectively contain a reference sample and an evaluation sample, samples of different compositions, or samples of the same configuration in order to evaluate reproducibility, temperature measurement values can be recorded while identifying the samples.

In this case, identification numbers (identification names) are allocated in advance to sensor units 2 that are installed on respective containers 20, and the identification numbers are recorded in recording unit 6 of sensor unit 2. On the other hand, the identification numbers allocated to sensor units 2 are recorded in recording unit 15 of analysis unit 9, and temperature measurement values corresponding to respective sensor units 2 can be recorded in recording unit 15. Thus, processing target material information, processing condition information, and temperature measurement values can be recorded in association with each other for each of the samples contained in containers 20.

Step S5: Analysis

Control unit 11 of analysis unit 9 performs information recording processing for recording a specific phenomenon appearing in the output values of temperature sensor 3 recorded in the above-described output value recording processing and content of post-comparison determination processing that is performed by determination unit 14 according to the phenomenon, in association with each other in recording unit 15. Alternatively, in the information recording processing, control unit 11 of analysis unit 9 records a specific phenomenon appearing in the output values of temperature sensor 3 recorded in the above-described output value recording processing, content of post-comparison determination processing that is performed by determination unit 14 according to the phenomenon, and stirring-degassing processing information including at least one of processing target material information and processing condition information regarding stirring-degassing processing, in association with each other in recording unit 15.

Specifically, as a result of temperature measurement values recorded in recording unit 15 of analysis unit 9 being displayed in output unit 12, the operator can check and analyze characteristics of the temporal transition of the temperature measurement values corresponding to processing target material information and processing condition information. Also, data of these temperature measurement values can be output as digital data and analyzed using an external computer or the like. The following describes specific examples of analysis processing with reference to FIGS. 13 to 15.

Figure 13:
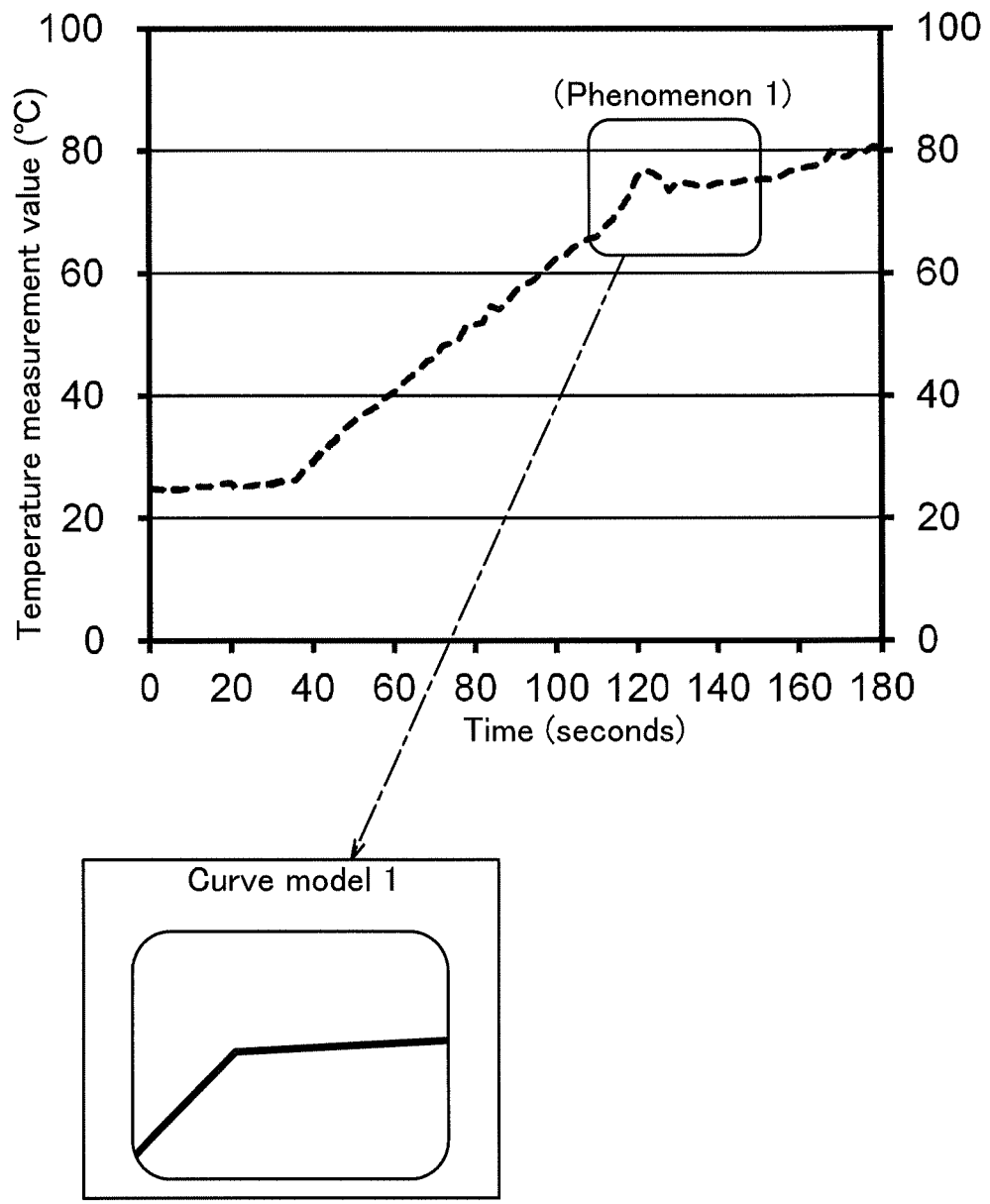
FIG. 13 is a diagram showing analysis processing.
Figure 14:
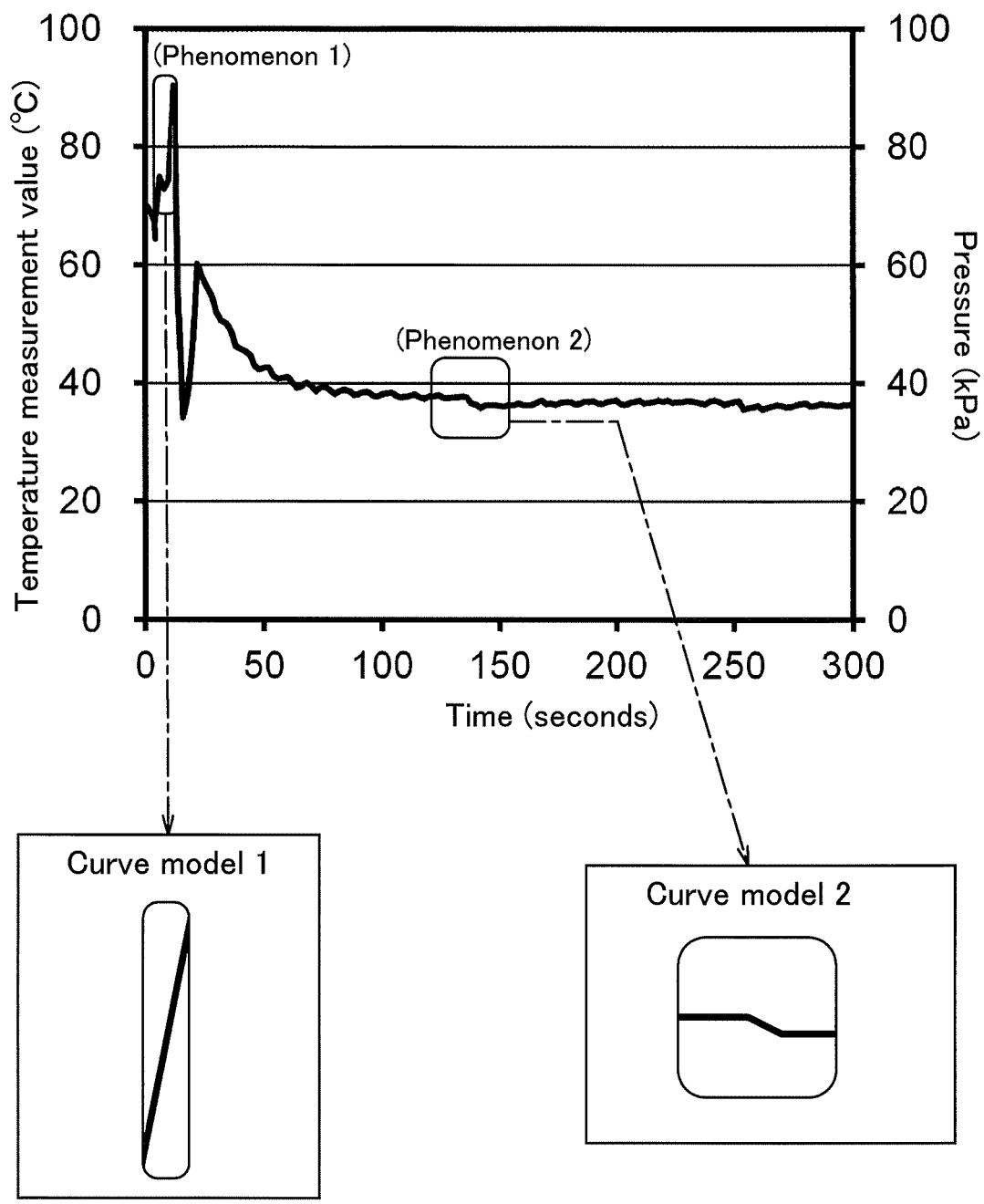
FIG. 14 is a diagram showing analysis processing.
Figure 15:
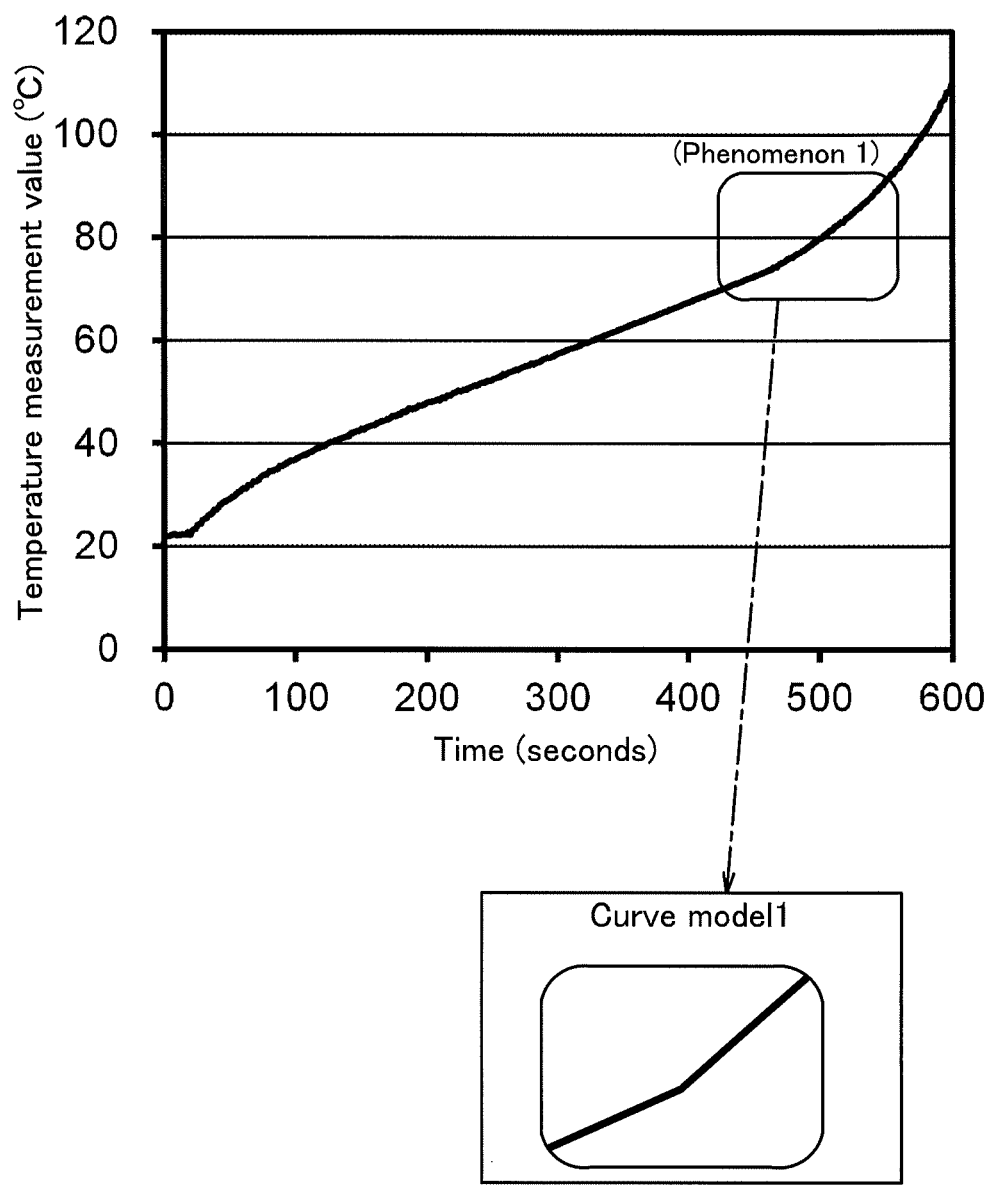
FIG. 15 is a diagram showing analysis processing.

As shown in FIGS. 13 to 15, graphs showing temporal changes in output values of temperature sensor 3 are displayed in output unit 12. The operator selects a specific phenomenon appearing in output values of the temperature sensor 3 using operation unit 13 of analysis unit 9. For example, the operator selects a region corresponding to a "phenomenon 1" in FIG. 13, selects regions corresponding to a "phenomenon 1" and a "phenomenon 2" in FIG. 14, and selects a region corresponding to a "phenomenon 1" in FIG. 15. Once regions corresponding to these phenomena are selected, control unit 11 of analysis unit 9 records, in recording unit 15, the specific phenomena appearing in output values of temperature sensor 3 within the regions selected by the operator. For example, control unit 11 records a specific phenomenon appearing in output values of temperature sensor 3 using numerical value information. Alternatively, control unit 11 records a specific phenomenon appearing in output values of temperature sensor 3 using a curve model.

In a case in which a specific phenomenon appearing in output values of temperature sensor 3 is recorded using numerical value information, control unit 11 of analysis unit 9 records, in recording unit 15, a temporal change in the output values that can be identified using at least one of an increase rate of output values of temperature sensor 3, a reduction rate of the output values, a change in the increase rate, and a change in the reduction rate, which is included in the "phenomenon 1", by using the numerical value information. For example, in the example shown in FIG. 13, control unit 11 can record the "phenomenon 1" using information indicating that "between a point at which the time was 120 seconds and a point at which the time was 140 seconds, there was a change in which the increase rate in the last 5 seconds became equal to or more than a predetermined first threshold value, and thereafter became equal to or less than a predetermined second threshold value". In the example shown in FIG. 14, control unit 11 can record the "phenomenon 1" using information indicating that "the change rate (increase rate) is 3° C./s or more" and record the "phenomenon 2" using information indicating that "after entering a state in which an average temperature in the last 10 seconds was within a range of 1.5° C. or less, the average temperature in the last 10 seconds decreased and was out of the range of 1.5° C.". In the example shown in FIG. 15, control unit 11 can record the "phenomenon 1" using information indicating that "the increase rate linearly changed, and thereafter increased by at least a set value".

In a case in which a specific phenomenon appearing in output values of temperature sensor 3 is recorded using a curve model, control unit 11 of analysis unit 9 determines an approximate curve (shape of a curve) of output values of temperature sensor 3 included in a region corresponding to a selected phenomenon. For example, in the example shown in FIG. 13, control unit 11 can record the "phenomenon 1" using shape information indicating a "curve model 1". In the example shown in FIG. 14, control unit 11 can record the "phenomenon 1" using shape information indicating a "curve model 1" and record the "phenomenon 2" using shape information indicating a "curve model 2". In the example shown in FIG. 15, control unit 11 can record the "phenomenon 1" using shape information indicating a "curve model 1".

Record State or State Transition of Processing Target Material According to Specific Phenomenon Appearing in Output Values of Temperature Sensor 3

The operator inputs a state or state transition of the processing target material according to the specific phenomenon appearing in output values of temperature sensor 3 using operation unit 13 of analysis unit 9. Then, analysis unit 9 performs information recording processing for recording the specific phenomenon appearing in output values of temperature sensor 3 recorded in the above-described output value recording processing and the state or state transition of the processing target material according to the phenomenon, in association with each other in recording unit 15. For example, in the example shown in FIG. 13, the operator inputs information indicating that "the processing target material transitioned from a state in which bubbles were not uniformly distributed to a state in which bubbles were uniformly distributed" as the state or state transition of the processing target material according to the "phenomenon 1". Then, control unit 11 of analysis unit 9 performs information recording processing for recording the "phenomenon 1" and the information regarding the state or state transition of the processing target material, which is accepted from the operator, in association with each other in recording unit 15. In the example shown in FIG. 14, the operator inputs information indicating that "the processing target material was vaporized" as the state or state transition of the processing target material according to the "phenomenon 1". Then, control unit 11 of analysis unit 9 performs information recording processing for recording the "phenomenon 1" and the information regarding the state or state transition of the processing target material, which is accepted from the operator, in association with each other in recording unit 15. Also, the operator inputs information indicating that "gelation ceased" as the state or state transition of the processing target material according to the "phenomenon 2". Then, control unit 11 of analysis unit 9 performs information recording processing for recording the "phenomenon 2" and the information regarding the state or state transition of the processing target material, which is accepted from the operator, in association with each other in recording unit 15. In the example shown in FIG. 15, the operator inputs information indicating that "crosslinking reaction was activated" as the state or state transition of the processing target material according to the "phenomenon 1". Then, control unit 11 of analysis unit 9 performs information recording processing for recording the "phenomenon 1" and the information regarding the state or state transition of the processing target material, which is accepted from the operator, in association with each other in recording unit 15.

Note that in the information recording processing, control unit 11 of analysis unit 9 can also record a specific phenomenon appearing in output values of temperature sensor 3 recorded in output value recording processing, content of post-comparison determination processing that is performed by determination unit 14 according to the phenomenon, and stirring-degassing processing information including at least one of processing target material information and processing condition information regarding stirring-degassing processing, in association with each other in recording unit 15.

Record Action According to Specific Phenomenon Appearing in Output Values of Temperature Sensor 3

The operator inputs an action according to the specific phenomenon appearing in output values of temperature sensor 3 by using operation unit 13 of analysis unit 9 to record the action in recording unit 15. In this case, control unit 11 of analysis unit 9 performs information recording processing for recording the specific phenomenon appearing in output values of temperature sensor 3, the action according to the phenomenon, and stirring-degassing processing information including at least one of processing target material information and processing condition information regarding stirring-degassing processing, in association with each other in recording unit 15. In an example of the information recording processing, the operator inputs analysis results such as change points and actions corresponding to processing target material information and processing condition information to analysis unit 9 by using operation unit 13 of analysis unit 9. Control unit 11 of analysis unit 9 records (registers), in recording unit 15 of analysis unit 9, the input analysis results and actions, such as recording of change points, setting of threshold values, or display of an alarm, in association with processing target material information and processing condition information.

Note that action varies according to processing target material information and processing condition information as described in the above cases. Therefore, state monitoring system 1 can be made to have a learning function by accumulating processing target material information, processing condition information, and information regarding action as described above, and managing accumulated information using a table.

(2) Product Processing Stage

S1: Read Data

The operator inputs stirring-degassing processing information that includes at least one of processing target material information and processing condition information regarding stirring-degassing processing, for example, processing target material information and processing condition information, to state monitoring system 1.

State monitoring system 1 determines the presence or absence of information regarding analysis results and actions or the state or state transition of the processing target material corresponding to the input processing target material information and processing condition information, by referring to a database stored in recording unit 15 of analysis unit 9, and if the database includes information regarding analysis results and actions or the state or state transition of the processing target material, state monitoring system 1 starts to measure the temperature, and if the database does not include information regarding analysis results and actions or the state or state transition of the processing target material, state monitoring system 1 can inform the operator of the absence of information regarding analysis results and actions or the state or state transition of the processing target material by outputting a warning via output unit 12 and suspend measurement and stirring-degassing processing. That is, determination unit 14 performs extraction processing for extracting, from information recorded in recording unit 15, information corresponding to stirring-degassing processing information that includes at least one of processing target material information and processing condition information regarding stirring-degassing processing, which is set prior to execution of the stirring-degassing processing.

Note that in some cases, the operator need not input processing target material information and processing condition information to state monitoring system 1. For example, if the operator performs stirring-degassing processing on processing target materials of one type every time under the same processing conditions, it is sufficient to store, in recording unit 15 of analysis unit 9, only information in which a phenomenon that may appear in output values of temperature sensor 3 during stirring-degassing processing is associated with content of post-comparison determination processing performed by determination unit 14 according to the phenomenon, and there is no need to record this information together with processing target material information and processing condition information in recording unit 15. Therefore, the above-described extraction processing is not performed in such a case.

S2: Measurement

Analysis unit 9 of state monitoring system 1 transmits an instruction to sensor unit 2. Sensor unit 2 transmits temperature measurement values of the processing target material measured by temperature sensor 3 and times to analysis unit 9 at a predetermined frequency for a predetermined period, together with an identification number of sensor unit 2 installed on container 20.

S3: Execute Post-Comparison Determination Processing

Analysis unit 9 of state monitoring system 1 records temperature measurement values and times received from sensor unit 2.

Control unit 11 of analysis unit 9 reads information regarding analysis results and actions or the state or state transition of the processing target material that is recorded (registered) in recording unit 15 and corresponds to processing target material information and processing condition information. Determination unit 14 determines whether or not it is necessary to take an action or determine the state or state transition of the processing target material according to the temperature measurement values, times, and the read information regarding analysis results and actions or the state or state transition of the processing target material. For example, determination unit 14 compares information recorded in recording unit 15 and a specific phenomenon that has appeared in output values of temperature sensor 3 during stirring-degassing processing, and performs post-comparison determination processing according to the result of comparison.

A specific phenomenon that has appeared in output values of temperature sensor 3 during stirring-degassing processing is compared with information recorded in recording unit 15 by comparing actual output values of temperature sensor 3 with numerical information or shape information regarding curve models corresponding to specific phenomena that may appear in output values of temperature sensor 3. In the former case, determination unit 14 determines whether or not the specific phenomenon that has appeared in output values of temperature sensor 3 during stirring-degassing processing matches numerical information regarding a phenomenon recorded in recording unit 15 by analyzing a temporal change in the output values that can be identified using at least one of the increase rate, the reduction rate, a change in the increase rate, and a change in the reduction rate of the output values of temperature sensor 3 during stirring-degassing processing. In the latter case, determination unit 14 determines whether or not the shape of a curve indicating a temporal change in the output values of temperature sensor 3 during stirring-degassing processing matches a curve model of a phenomenon recorded in recording unit 15. If there is a phenomenon that matches, determination unit 14 performs post-comparison determination processing associated with the phenomenon. If there is no phenomenon that matches, determination unit 14 can take an action by, for example, recording that a phenomenon that is recorded in recording unit 15 and may appear in output values of temperature sensor 3 during stirring-degassing processing could not be detected, as described above.

Determination unit 14 performs, as post-comparison determination processing, processing for determining the state or state transition of the processing target material according to the specific phenomenon that has appeared in output values of temperature sensor 3 during stirring-degassing processing or processing for taking an action according to the specific phenomenon that has appeared in output values of temperature sensor 3 during stirring-degassing processing. For example, determination unit 14 makes individual determinations based on a time and a temperature corresponding to a change point, comparison between the increase rate or the variation amount of the temperature measurement value with a threshold value, and the like, and executes an action by displaying an alarm, stopping stirring-degassing processing, recording normal completion, or the like.

As described above, in the development stage (stage for optimizing conditions), state monitoring system 1 registers processing target material information and processing condition information as a database, registers temporal transition (time dependency) of the temperature measurement value in association with processing target material information and processing condition information, and further registers, as a database, information regarding analysis results and actions or the state or state transition of the processing target material in association with processing target material information and processing condition information.

In this development stage, state transition during stirring-degassing processing can be quantitatively measured in real time, although this has been difficult, and cost and labor of optimization of stirring-degassing conditions, which requires skill, can be reduced.

Also, in the product processing stage (mass production stage), state monitoring system 1 acquires temporal transition (time dependency) of the temperature measurement value of the processing target material, reads registered information regarding analysis results and actions or the state or state transition of the processing target material corresponding to processing target material information and processing condition information, performs determination for each case based on the acquired temporal transition (time dependency) of the temperature measurement value and the read information regarding analysis results and actions or the state or state transition of the processing target material, and executes required post-comparison determination processing.

In this product processing stage, the state of the processing target material can be quantitatively monitored in real time during stirring-degassing processing, determination of the stirring-degassing state and control of the stirring-degassing processing can be appropriately performed based on information regarding action or the state or state transition of the processing target material, which is registered in advance, and this facilitates maintenance, improvement, and control of the quality of produced products.

Next, advantages of state monitoring system 1 according to the present embodiment will be described with reference to FIG. 16. FIG. 16 shows a graph showing temporal transition of the temperature measurement value, which is the same as the graph shown in FIG. 15. The following description focuses on a phenomenon that appears around 500 seconds in the graph shown in FIG. 16 and in which "the increase rate linearly changed, and thereafter increased by at least a set value". This phenomenon corresponds to the "phenomenon 1" shown in FIG. 15. As described above, this phenomenon is set according to a state or state transition of the processing target material in which "crosslinking reaction was activated". That is, an action is set according to a state or state transition of the processing target material corresponding to a specific phenomenon. Therefore, in stirring-degassing processing of Example 1, it is determined that the phenomenon has occurred around a time point t1, and in stirring-degassing processing of Example 2, it is determined that the phenomenon has occurred around a time point t2. Then, the action is performed by ending stirring-degassing processing, for example, according to "crosslinking reaction being activated".

The following considers, as a comparative example, a case in which an action according to a specific phenomenon that has appeared in output values of temperature sensor 3 during stirring-degassing processing is not set according to a state or state transition of the processing target material corresponding to the specific phenomenon, i.e., the action is merely set according to a temperature value. For example, assume a case in which the action is performed by ending stirring-degassing processing, for example, when the temperature reaches a temperature T1, irrespective of the state or state transition of the processing target material. In this case, in both of the stirring-degassing processing of Example 1 and the stirring-degassing processing of Example 2, it is determined that the phenomenon has occurred at a time point at which the temperature has reached the temperature T1, and the action is performed by ending stirring-degassing processing, for example. In the stirring-degassing processing of Example 2, the processing target material is determined as being in the state in which "crosslinking reaction was activated" when the temperature is around a temperature T2 (time point t2), rather than around the temperature T1 (time point t1). That is, in the case of the stirring-degassing processing of Example 2, there is a problem in that if it is determined that the phenomenon has occurred and the stirring-degassing processing is ended at a time point at which the temperature has reached the temperature T1, the stirring-degassing processing is ended at an inappropriate timing even though crosslinking reaction has not yet been activated.

As described above, in the present embodiment, an action is set according to a state or state transition of the processing target material corresponding to a specific phenomenon, and therefore the action can be performed at a timing that is appropriate in terms of the state or state transition of the processing target material.

Next, other features of the present invention will be described.

A state monitoring system for stirring-degassing processing is characterized in that the state monitoring system includes an analysis unit and a sensor unit, the analysis unit includes a recording unit and a determination unit, the sensor unit includes a temperature sensor, the sensor unit transmits temperature measurement values of a processing target material of stirring-degassing processing measured by the temperature sensor to the analysis unit,

- a database of processing target material information and processing information and a database of action associated with the processing target material information and the processing information are registered in the recording unit, and the determination unit executes the action registered in the recording unit according to the transmitted temperature measurement values.

Temperature measurement values acquired using the temperature sensor depend on the processing target material and processing conditions and reflect the state of the processing target material. Therefore, the state of the processing target material can be quantitatively monitored using temperature measurement values.

Furthermore, as a result of a database of actions associated with the processing target material and processing conditions being made in advance, the monitoring system can automatically execute a registered action based on the acquired temperature measurement values.

Therefore, the quality of products can be quantitatively controlled by using the monitoring system, and the monitoring system contributes to maintenance and improvement of the quality. Furthermore, knowledge and know-how obtained in the product development stage can be transferred to the product mass production stage and sufficiently utilized independently of the ability of the operator.

Also, the state monitoring system for stirring-degassing processing is characterized in that the processing target material information includes information regarding the blending ratio of the processing target material or a change in characteristics of the processing target material.

If such information is included as processing target material information, action can be executed according to the processing target material in view of the influence of frictional heat due to a change in the viscosity during stirring-degassing processing.

Also, the state monitoring system for stirring-degassing processing is characterized in that the action includes performing determination based on comparison between a threshold value and a variation amount of the temperature measurement value at a change point in temporal transition of the temperature measurement value.

If a variation amount of the temperature measurement value at a change point is compared with a predetermined threshold as described above, abnormality can be detected, and this contributes to control of the quality of products.

Also, the state monitoring system for stirring-degassing processing is characterized in that the sensor unit is attached to an upper side of a container containing the processing target material subjected to stirring-degassing processing and further includes a first transmitter-receiver, the analysis unit further includes a second transmitter-receiver, the first transmitter-receiver transmits the temperature measurement values to the analysis unit using wireless communication, and the second transmitter-receiver receives the transmitted temperature measurement values.

With this configuration, the temperature of a surface of the processing target material can be measured, and the state monitoring system can be easily applied without modifying an existing stirring-degassing apparatus. Note that attaching the sensor unit to the upper side of the container includes attaching the sensor unit to a lid portion of the container, a container holder, or a position other than the lid portion of the container and the container holder by using a jig or the like. That is, it is important to attach the sensor unit to the upper side, and there is no limitation to the lid portion described in the above embodiment.

A stirring-degassing method is characterized by including
- acquiring a temporal change in temperature measurement values by measuring the temperature of a processing target material at a predetermined frequency for a predetermined period by using a temperature sensor from above, the processing target material being contained in a container to which rotational movement is applied under predetermined processing conditions, and
- executing an action that is registered in advance in association with a combination of the processing target material and the processing conditions, based on the temporal change in the temperature measurement values.

Specifically, the stirring-degassing method may be realized with a configuration in which the above-described state monitoring system for stirring-degassing processing acquires the temperature measurement values of the processing target material at least for a period from the start to the end of stirring-degassing processing, and executes the action.

With this stirring-degassing method, the state of the processing target material can be monitored during stirring-degassing processing, and maintenance, improvement, and control of the quality of the processing target material subjected to the processing are facilitated.

Also, the stirring-degassing method is characterized in that temperature measurement values acquired with respect to processing target materials by using temperature sensors are compared, and the registered action is executed.

As a result of processing target materials processed at the same time being compared in the stirring-degassing method, the quality of the processing target materials can be controlled without being affected by variation in processing conditions.

OTHER EMBODIMENTS

1.

A specific example of the configuration of the state monitoring system is described in the above embodiment, but the configuration can be appropriately changed.

For example, information communication between sensor unit 2 and analysis unit 9 and between stirring-degassing apparatus 100 and analysis unit 9 in the above embodiment may also be performed via another relay apparatus such as a wireless LAN router.

Analysis unit 9 and stirring-degassing apparatus 100 may also be configured as a single piece. That is, functions and devices of analysis unit 9 may also be realized using functions and devices included in stirring-degassing apparatus 100.

Also, some specific examples are described regarding the state or state transition of the processing target material corresponding to a specific phenomenon that has appeared in output values of temperature sensor 3 during stirring-degassing processing, and an action according to the specific phenomenon that has appeared in output values of temperature sensor 3 during stirring-degassing processing, but those examples are described for an illustrative purpose only, and the present invention is not limited to those examples. For example, determination unit 14 may also perform, as an action, processing for outputting predetermined information from output unit 12 to prompt the operator to change operations of stirring-degassing apparatus 100.

2.

An example in which information indicating content of post-comparison determination processing performed by determination unit 14 is output from output unit 12 of analysis unit 9 is described in the above embodiment, but there are various configurations for outputting the information other than that described above. For example, a configuration is also possible in which output unit 12 causes transmitter-receiver 10 to transmit information to stirring-degassing apparatus 100, and the information is output from output unit 33 of stirring-degassing apparatus 100. Alternatively, a configuration is also possible in which output unit 12 causes transmitter-receiver 10 to transmit information to another device, such as a portable communication device, that is used by the operator, and the information is output from the device to the operator. In this case, output unit 12 can also transmit information to the operator by transmitting information, such as an email or message (push notification), to the device. Furthermore, information may also be transmitted to the operator by causing vibration in the portable communication device used by the operator.

3.

A case in which stirring-degassing apparatus 100 operates in response to an instruction accepted from the operator is described in the above embodiment, but a configuration is also possible in which control apparatus 30 of stirring-degassing apparatus 100 automatically determines and executes an appropriate operation, independently of an instruction from the operator.

4.

The configurations disclosed in the above embodiments (including the other embodiments) can be applied in combination with configurations disclosed in other embodiments so long as no contradiction is incurred. The embodiments disclosed in the specification are examples, and embodiments of the present invention are not limited to those embodiments and can be appropriately modified within a range not departing from the objects of the present invention.

INDUSTRIAL APPLICABILITY

The present invention can be used for a state monitoring system with which the state of a processing target material can be easily and quantitatively monitored in real time during stirring-degassing processing.

DESCRIPTION OF REFERENCE SIGNS

1: state monitoring system
2: sensor unit
3: temperature sensor
8: first transmitter-receiver
9: analysis unit
10: second transmitter-receiver
12: output unit
14: determination unit
15: recording unit
20: container
100: stirring-degassing apparatus

The invention claimed is:

1. A state monitoring system for stirring-degassing processing that is performed while revolving and rotating a container containing a processing target material in a stirring-degassing apparatus, the state monitoring system comprising:
a sensor unit comprising a temperature sensor configured to determine a temperature of the processing target material, and a first transmitter-receiver configured to transmit output values of the temperature sensor to a computer; and
the computer comprising a second transmitter-receiver, an information recorder, and a processor, wherein the second transmitter-receiver is configured to receive the output values of the temperature sensor transmitted by the first transmitter-receiver;
wherein the processor of the computer is configured to:
record, before the processor causes the container to revolve and rotate, a first temporal change in the information recorder, the first temporal change being based on at least one selected from the group consisting of: a rate of increase of the output values; a rate of reduction of the output values; a change in the rate of increase of the output values; and a change in the rate of reduction of the output values;
start the stirring-degassing processing, wherein, when starting the stirring-degassing processing, the processor is configured to cause the container to revolve and rotate;
compare, during the stirring-degassing processing, the first temporal change to a second temporal change, the second temporal change being based on at least one selected from the group consisting of: the rate of increase of the output values while the container is revolving and rotating; the rate of reduction of the output values while the container is revolving and rotating; the change in the rate of increase of the output values while the container is revolving and rotating; and the change in the rate of reduction of the output values while the container is revolving and rotating; and performing, based on the comparison of the first temporal change to the second temporal change, a post-comparison action, which is (i) outputting an alarm, (ii) stopping the stirring-degassing processing, (iii) outputting an operation instruction for the stirring-degassing apparatus, (iv) determining a state or a state transition of the processing target material according to the second temporal change that appeared in the output values of the temperature sensor during the stirring-degassing processing, (v) recording that the stirring-degassing processing has been normally executed, (vi) recording that the stirring-degassing processing has not been normally executed, or (vii) recording that the second temporal change could not be detected in the output values of the temperature sensor obtained during the stirring-degassing processing.

2. The state monitoring system according to claim 1, wherein the processor is further configured to perform:

recording, in the information recorder, the second temporal change of the output values of the temperature sensor in a form of shape information of a curve in a graph or numerical value, the output values being obtained during the stirring-degassing processing and received by the second transmitter-receiver; and associating, in the information recorder, the second temporal change recorded in the form of shape information or numerical information, with the content of the post-comparison action.

3. The state monitoring system according to claim 2, wherein:

the computer includes a display configured to display the output values of the temperature sensor and an interface that accepts input from an operator; and the second temporal change appears in the output values of the temperature sensor in a region that is selected by the operator using the interface from the output values of the temperature sensor displayed in the display.

4. The state monitoring system according to claim 1, wherein the computer includes an output unit configured to output the content of the post-comparison action.

5. The state monitoring system according to claim 1, wherein the post-comparison action is set according to a state or a state transition of the processing target material corresponding to the second temporal change that appeared in the output values of the temperature sensor during the stirring-degassing processing.

6. The state monitoring system according to claim 1, wherein the computer includes an output unit for outputting the alarm therefrom.

7. The state monitoring system according to claim 1, wherein the temperature sensor outputs the output values that reflect intensity of radiation light radiated from the processing target material.

8. The state monitoring system according to claim 1, wherein:

the temperature sensor measures intensity of radiation light radiated from the processing target material;

the first temporal change is a set value;

the second temporal change is a rate of change of the output values of the temperature sensor; and if a magnitude of the rate of change of the output values of the temperature sensor has become equal to or larger than the set value during the stirring-degassing processing of the processing target material, the processor determines that vaporization of a substance contained in the processing target material has occurred.

9. The state monitoring system according to claim 1, wherein the processor of the computer is further configured to identify, before the stirring-degassing processing, the first temporal change.

10. The state monitoring system according to claim 1, wherein the first temporal change is recorded in a form of shape information of a curve in a graph or numerical value information.

* * * * *